US012104686B2

(12) United States Patent
Hsieh et al.

(10) Patent No.: US 12,104,686 B2
(45) Date of Patent: Oct. 1, 2024

(54) DYNAMIC POWER DEVICE, AUTOMATIC MOBILE VEHICLE, TRANSFER APPARATUS, DYNAMIC POWER SUPPLY SYSTEM, AND ELECTRIC BICYCLE

(71) Applicant: MAIN DRIVE CORPORATION, Hsinchu (TW)

(72) Inventors: Kun-Ju Hsieh, Hsinchu (TW); Chang-Lin Lee, Hsinchu (TW); Tung-Yu Li, Hsinchu (TW); Ching-Huei Wu, Hsinchu (TW); Hsiu-Chen Tang, Hsinchu (TW)

(73) Assignee: MAIN DRIVE CORPORATION, Hsinchu (TW)

( * ) Notice: Subject to any disclaimer, the term of this patent is extended or adjusted under 35 U.S.C. 154(b) by 529 days.

(21) Appl. No.: 17/493,305

(22) Filed: Oct. 4, 2021

(65) Prior Publication Data

US 2022/0106012 A1    Apr. 7, 2022

Related U.S. Application Data

(60) Provisional application No. 63/087,908, filed on Oct. 6, 2020.

(30) Foreign Application Priority Data

Aug. 25, 2021  (TW) ................................ 110131381

(51) Int. Cl.
*F16H 49/00* (2006.01)
*B62J 45/411* (2020.01)
(Continued)

(52) U.S. Cl.
CPC ............. *F16H 49/001* (2013.01); *B62M 6/55* (2013.01); *B62J 45/411* (2020.02); *B62M 6/50* (2013.01);
(Continued)

(58) Field of Classification Search
CPC ......... F16H 49/001; F16H 2057/02034; F16H 2057/02043; B62M 6/55; B62M 6/50;
(Continued)

(56) References Cited

U.S. PATENT DOCUMENTS 6,152,249 A    11/2000  Li
7,230,402 B2    6/2007  Kumagai
(Continued)

FOREIGN PATENT DOCUMENTS

CN         1744971 A     3/2006
CN       105952848 A     9/2016
(Continued)

OTHER PUBLICATIONS

European Patent Office, Search Report issued on Feb. 17, 2022 for EP application No. 21200675.3.

*Primary Examiner* — Terence Boes
(74) *Attorney, Agent, or Firm* — Li & Cai Intellectual Property (USA) Office

(57) ABSTRACT

A harmonic deceleration module, a dynamic power device, an automatic mobile vehicle, a transfer apparatus, a dynamic power supply system, and an electric bicycle are provided. The harmonic deceleration module includes a connecting member, a flexible bearing, a first frame, a first circular spline, a second frame, and a second circular spline. When the connecting member is driven, the connecting member rotates around a central axis. The connecting member has a cam part, and the cam part and the flexible bearing jointly form a wave generator. The wave generator is configured to be driven by the connecting member to drive a flexspline to continually and flexibly deform, and the flexspline drives the second circular spline and the second frame connected to the
(Continued)

second circular spline to rotate. The second frame has a hollow channel penetrating through the second frame along the central axis.

17 Claims, 28 Drawing Sheets

(51) Int. Cl.
- *B62M 6/50* (2010.01)
- *B62M 6/55* (2010.01)
- *B62M 6/90* (2010.01)
- *B62M 9/00* (2006.01)
- *F16D 41/066* (2006.01)
- *F16D 41/28* (2006.01)
- *F16H 57/02* (2012.01)
- *H02K 7/116* (2006.01)

(52) U.S. Cl.
CPC ............... *B62M 6/90* (2013.01); *B62M 9/00* (2013.01); *F16D 41/066* (2013.01); *F16D 41/28* (2013.01); *F16H 2057/02034* (2013.01); *F16H 2057/02043* (2013.01); *H02K 7/116* (2013.01)

(58) Field of Classification Search
CPC .......... B62M 6/90; B62M 9/00; B62J 45/411; F16D 41/066; F16D 41/28; H02K 7/116
See application file for complete search history.

(56) References Cited

U.S. PATENT DOCUMENTS

| | | | |
|---|---|---|---|
| 7,253,578 B2 | 8/2007 | Kumagai | |
| 7,967,870 B2 | 6/2011 | Ko | |
| 9,341,252 B2 * | 5/2016 | Zhang | F16H 49/001 |
| 9,644,727 B2 | 5/2017 | Yajima | |
| 9,772,021 B2 | 9/2017 | Handa et al. | |
| 11,168,775 B2 | 11/2021 | Kiyosawa et al. | |
| 2008/0108475 A1 | 5/2008 | Perng | |
| 2014/0083245 A1 * | 3/2014 | Yeh | F16H 1/10 74/640 |
| 2019/0160654 A1 | 5/2019 | Moritani et al. | |

FOREIGN PATENT DOCUMENTS

| | | |
|---|---|---|
| CN | 106015514 A | 10/2016 |
| CN | 106995034 A | 8/2017 |
| CN | 109866866 A | 6/2019 |
| CN | 110027008 A | 7/2019 |
| DE | 102018128802 A1 | 5/2019 |
| JP | 62200056 A | 9/1987 |
| JP | 2113048 U | 9/1990 |
| JP | 11227665 A | 8/1999 |
| JP | 201163218 A | 3/2011 |
| JP | 201595987 A | 5/2015 |
| JP | 201997363 A | 6/2019 |
| JP | 2020118200 A | 8/2020 |
| KR | 1020160033161 A | 3/2016 |
| SU | 1416299 A1 | 8/1988 |
| TW | M328364 U | 3/2008 |
| TW | 201750281 U | 2/2011 |
| TW | 201437518 A | 10/2014 |
| TW | 201530017 A | 8/2015 |
| TW | 201838292 A | 10/2018 |
| TW | 202012810 A | 4/2020 |
| TW | M595029 U | 5/2020 |
| TW | M621127 U | 12/2021 |
| WO | WO 2004078423 A1 | 9/2004 |
| WO | WO 2015019420 A1 | 2/2015 |

\* cited by examiner

DYNAMIC POWER DEVICE, AUTOMATIC MOBILE VEHICLE, TRANSFER APPARATUS, DYNAMIC POWER SUPPLY SYSTEM, AND ELECTRIC BICYCLE

CROSS-REFERENCE TO RELATED PATENT APPLICATION

This application claims the benefit of priority to U.S. Patent Application No. 63/087,908 filed on Oct. 6, 2020. The entire content of the above identified application is incorporated herein by reference.

This application claims the benefit of priority to Taiwan Patent Application No. 110131381, filed on Aug. 25, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a deceleration module, a dynamic power device, an automatic mobile vehicle, a transfer apparatus, a dynamic power supply system, and an electric bicycle, and the dynamic power device, the automatic mobile vehicle, the transfer apparatus, the dynamic power supply system, and the electric bicycle respectively include the deceleration module. The present disclosure more particularly relates to a harmonic deceleration module, a dynamic power device, an automatic mobile vehicle, a transfer apparatus, a dynamic power supply system, and an electric bicycle, and the dynamic power device, the automatic mobile vehicle, the transfer apparatus, the dynamic power supply system, and the electric bicycle respectively include the harmonic deceleration module.

BACKGROUND OF THE DISCLOSURE

Conventional dynamic power devices having motors and speed reducers which are commonly used in electric bicycles have the problem of being bulky in size, thus directly affecting the overall aesthetics of electric bicycles.

SUMMARY OF THE DISCLOSURE

In response to the above-referenced technical inadequacy, the present disclosure provides a harmonic deceleration module, a dynamic power device, an automatic mobile vehicle, a transfer apparatus, a dynamic power supply system, and an electric bicycle to improve the above-referenced technical inadequacy.

In one aspect, the present disclosure provides a harmonic deceleration module, and the harmonic deceleration module includes a connecting member, a flexible bearing, a flexspline, a first frame, a first circular spline, a second frame, and a second circular spline. The connecting member has two opposite ends and a cam part. The two opposite ends are respectively defined as a first end and a second end, and the connecting member is configured to be connected to an outer driving unit. When the connecting member is driven to rotate by the outer driving unit, the connecting member rotates around a central axis. The flexible bearing has an inner ring and an outer ring, the inner ring is fixed at a periphery of the cam part, and when the connecting member is driven to rotate, the cam part and the flexible bearing jointly form a wave generator. The flexspline is connected to the outer ring of the flexible bearing by an inner side thereof, and the flexspline has a plurality of outer gear-shaped structures formed on a periphery of the flexspline. Part of the first frame is pivotally connected to a periphery of the connecting member. The first circular spline is a ring-shaped structure and has a plurality of first inner gear-shaped structures, the first circular spline and the first frame are fixed to each other, and the first inner gear-shaped structures and the outer gear-shaped structures are meshed with each other. Part of the second frame is pivotally connected to the periphery of the connecting member, the second frame is configured to be connected to an outer output member, and when the second frame is driven to rotate, the second frame rotates around the central axis. The second circular spline is a ring-shaped structure and has a plurality of second inner gear-shaped structures, the second circular spline and the second frame are fixed to each other, and the second inner gear-shaped structures and the outer gear-shaped structures are meshed with each other. A quantity of the first inner gear-shaped structures of the first circular spline is equal to a quantity of the outer gear-shaped structures of the flexspline, and a quantity of the second inner gear-shaped structures of the second circular spline is greater than the quantity of the outer gear-shaped structures of the flexspline. When the connecting member is driven to rotate around the central axis, the wave generator drives the flexspline to continually and flexibly deform, the flexspline drives the second circular spline to rotate, and the second frame rotates around the central axis along with the second circular spline. A dynamic power input by the connecting member is decelerated and output by the second frame.

In one aspect, the present disclosure provides a dynamic power device, and the dynamic power device includes a harmonic deceleration module, a driving unit, an outer housing, and an outer end. The harmonic deceleration module includes a connecting member, a flexible bearing, a flexspline, a first frame, a first circular spline, a second frame, a second circular spline, and an end cap. The connecting member has two opposite ends and a cam part, the two opposite ends are respectively defined as a first end and a second end, and the connecting member is configured to be driven to rotate around a central axis. The flexible bearing has an inner ring and an outer ring, the inner ring is fixed at a periphery of the cam part, and when the connecting member is driven to rotate, the cam part and the flexible bearing jointly form a wave generator. The flexspline is connected to the outer ring of the flexible bearing by an inner side thereof, and the flexspline has a plurality of outer gear-shaped structures formed on a periphery of the flexspline. Part of the first frame is pivotally connected to a periphery of the connecting member. The first circular spline is a ring-shaped structure and has a plurality of first inner gear-shaped structures, the first circular spline and the first frame are fixed to each other, and the first inner gear-shaped structures and the outer gear-shaped structures are meshed with each other. Part of the second frame is pivotally connected to the periphery of the connecting member, the second frame is configured to be connected to an outer output member, and when the second frame rotates, the second frame is driven to rotate around the central axis. The second circular spline is a ring-shaped structure and has a plurality of second inner gear-shaped structures, the second circular spline and the second frame are fixed to each other, and the second inner gear-shaped structures and the outer gear-shaped structures are meshed with each other. The end cap is fixedly disposed on an end of the first frame, and the end cap and a periphery of the second frame are pivotally connected to each other. A quantity of the first inner gear-shaped structures of the first circular spline is equal to a quantity of the outer gear-shaped structures of the flexspline, and a quantity of the second inner gear-shaped structures of the second circular spline is greater than the quantity of the outer gear-shaped structures of the flexspline. The driving unit is connected to the connecting member. The outer housing is a hollow structure, and the harmonic deceleration module and the driving unit are disposed in the outer housing. The outer end cap is fixedly disposed on an end of the outer housing. When the driving unit is controlled to drive the connecting member to rotate around the central axis, the wave generator drives the flexspline to continually and flexibly deform, the flexspline drives the second circular spline to rotate, and the second frame rotates around the central axis along with the second circular spline. A dynamic power input by the connecting member is decelerated and output by the second frame.

In one aspect, the present disclosure provides an automatic mobile vehicle, and the automatic mobile vehicle includes the dynamic power device mentioned above, at least one wheel, and a processing module. One of the at least one wheel is connected to the second frame, and the processing module is electrically connected to the driving unit. The processing module is configured to control the driving unit to drive the one of the at least one wheel connected to the second frame to rotate by the harmonic deceleration module.

In one aspect, the present disclosure provides a transfer apparatus, and the transfer apparatus includes at least one of the dynamic power device as mentioned above, at least one connecting assembly, and at least one processing module. The second frame of the at least one of the dynamic power device and the at least one connecting assembly are connected to each other, the at least one processing module is electrically connected to the driving unit of the at least one of the dynamic power device, and the at least one of the processing module is configured to control the driving unit to drive the at least one of the connecting assembly that is connected to the second frame by the harmonic deceleration module.

In another aspect, the present disclosure provides a dynamic power supply system, and the dynamic power supply system is configured to be mounted on a frameset of an electric bicycle and includes the dynamic power device as mentioned above. The dynamic power supply system further includes a crank spindle, two cranks, a chainring, a first one-way clutch, and a second one-way clutch. The two cranks are connected to two ends of the crank spindle by one of two ends of each of the cranks, respectively, and another of two ends of each of the cranks is configured to be connected to a pedal. The first one-way clutch is correspondingly connected to the crank spindle and the chainring. The second one-way clutch is correspondingly connected to the second frame and the first one-way clutch. The dynamic power device further includes a first auxiliary end cap and a second auxiliary end cap. The first auxiliary end cap is a ring-shaped structure, a periphery of the first auxiliary end cap and an inner side of an outer through hole of an outer end cap are fixed to each other, and an inner side of the first auxiliary end cap and a periphery of the crank spindle are pivotally connected to each other. The second auxiliary end cap is fixed on an end of an outer housing, and the second auxiliary end cap and the first one-way clutch are pivotally connected to each other. When the two pedals are pedaled to drive the electric bicycle to move forward, the two cranks drive the crank spindle to rotate in a first direction, the crank spindle drives the first one-way clutch to rotate synchronously with the chainring in the first direction, and the chainring is configured to drive a rear wheel of the electric bicycle by a transmission member. When the two cranks are driven to rotate in a second direction, the crank spindle rotates synchronously with the first one-way clutch in the second direction, and the first one-way clutch does not rotate synchronously with the chainring. The second direction is opposite to the first direction. When the driving unit is controlled to drive the connecting member to rotate in the first direction, the flexspline is driven to continually and flexibly deform and drives the second circular spline to rotate, the second frame rotates with the second circular spline in the first direction so as to drive synchronous movement of the second one-way clutch and the first one-way clutch, such that the chainring is driven to rotate in the first direction.

In yet another aspect, the present disclosure provides an electric bicycle, and the electric bicycle includes the dynamic power supply system and the frameset as mentioned above, a processing module, and an electric power system. The frameset includes a bike frame, a handlebar, a front wheel, the rear wheel, a saddle, a brake system, and the transmission member, the dynamic power supply system is disposed on the frameset, the processing module is electrically connected to the driving unit, and the electric power system is electrically connected to the processing module and is configured to provide electrical power to the dynamic power supply system.

In conclusion, the harmonic deceleration module of the present disclosure and the harmonic deceleration module respectively mounted in the dynamic power device, the automatic mobile vehicle, the transfer apparatus, the dynamic power supply system, and the electric bicycle of the present disclosure are smaller in size than a conventional harmonic deceleration module and conventional harmonic deceleration modules that are mounted in conventional dynamic power devices, conventional automatic mobile vehicles, conventional transfer apparatus, conventional dynamic power supply systems, and conventional electric bicycles.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
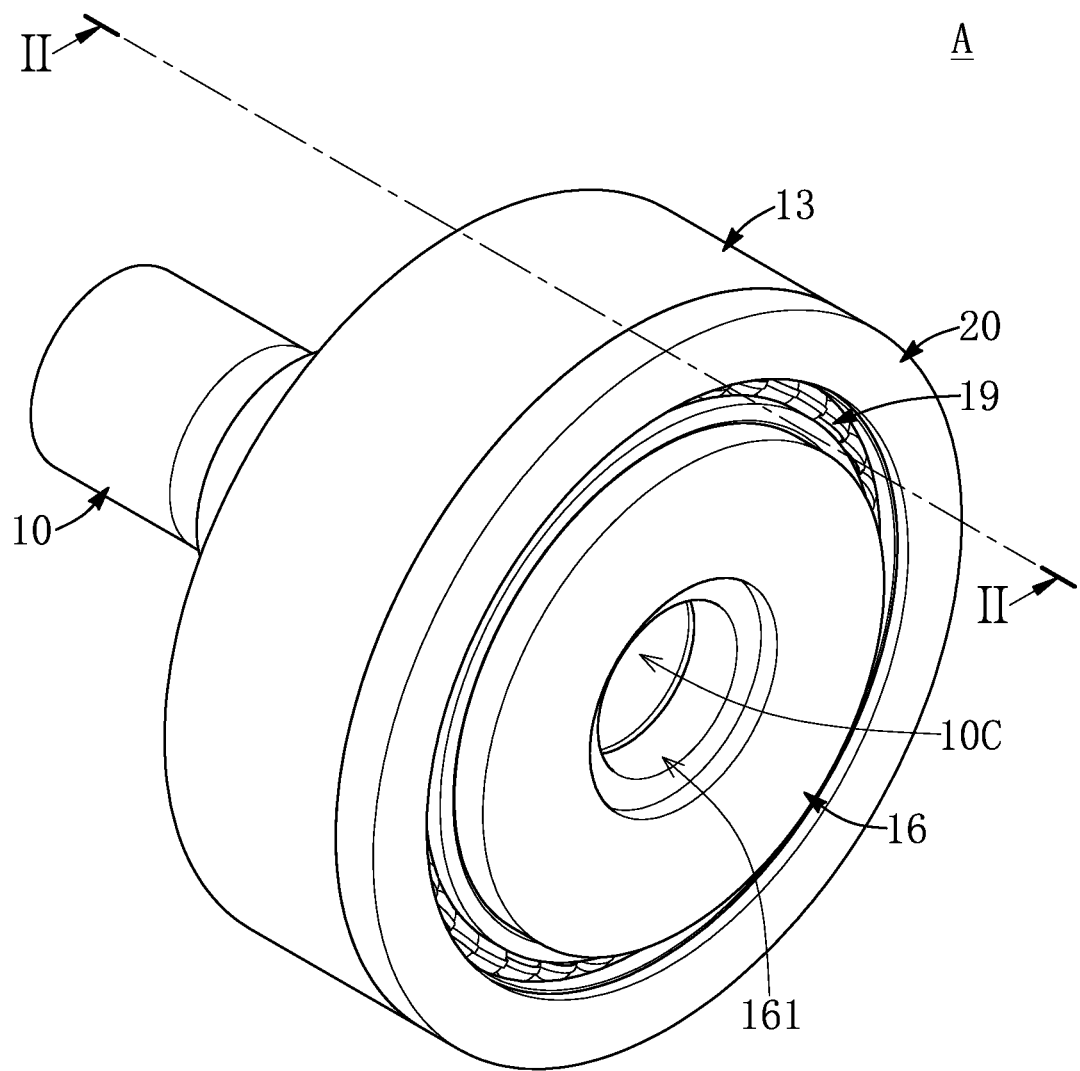
FIG. 1 is a schematic view of a harmonic deceleration module according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 7, the present disclosure provides a harmonic deceleration module A, and the harmonic deceleration module A includes a connecting member 10, a flexible bearing 11, a flexspline 12, a first frame 13, a first circular spline 14, a first bearing 15, a second frame 16, a second circular spline 17, a second bearing 18, a third bearing 19, and an end cap 20.

As shown in FIG. 2 to FIG. 5, the connecting member 10 has two opposite ends respectively defined as a first end 10A and a second end 10B, and the connecting member 10 can be a substantially cylindrical structure. The connecting member 10 can have a cam part 101, a first annular part 102, a first annular limiting part 103, a second annular part 104, and a second annular limiting part 105, and the connecting member 10 can sequentially have the second annular part 104, the second annular limiting part 105, the cam part 101, the first annular limiting part 103, and the first annular part 102 in a direction from the first end 10A to the second end 10B.

In the connecting member 10, an outer diameter of the first annular part 102 is less than an outer diameter of the first annular limiting part 103, the outer diameter of the first annular limiting part 103 is less than an outer diameter of the cam part 101, an outer diameter of the second annular limiting part 105 is less than the outer diameter of the cam part 101, and an outer diameter of the second annular part 104 is less than the outer diameter of the second annular limiting part 105.

The flexible bearing 11 has an inner ring 111 and an outer ring 112, the inner ring 111 of the flexible bearing 11 and a periphery 1011 of the cam part 101 of the connecting member 10 are fixed to each other, and the outer ring 112 of the flexible bearing 11 and an inner side of the flexspline 12 are fixed to each other. The flexspline 12 has a plurality of outer gear-shaped structures 121 formed on a periphery of the flexspline 12, a quantity of the outer gear-shaped structures 121 of the flexspline 12 is not limited to those as shown in the drawings of the present disclosure, and can be increased or decreased according to practical requirements.

It should be noted that the periphery 1011 of the cam part 101 is in an elliptical shape, and the cam part 101 is used as a cam. When the connecting member 10 is driven, the cam part 101 and the flexible bearing 11 jointly form a wave generator to drive the flexspline 12 to continually and flexibly deform.

Figure 2:
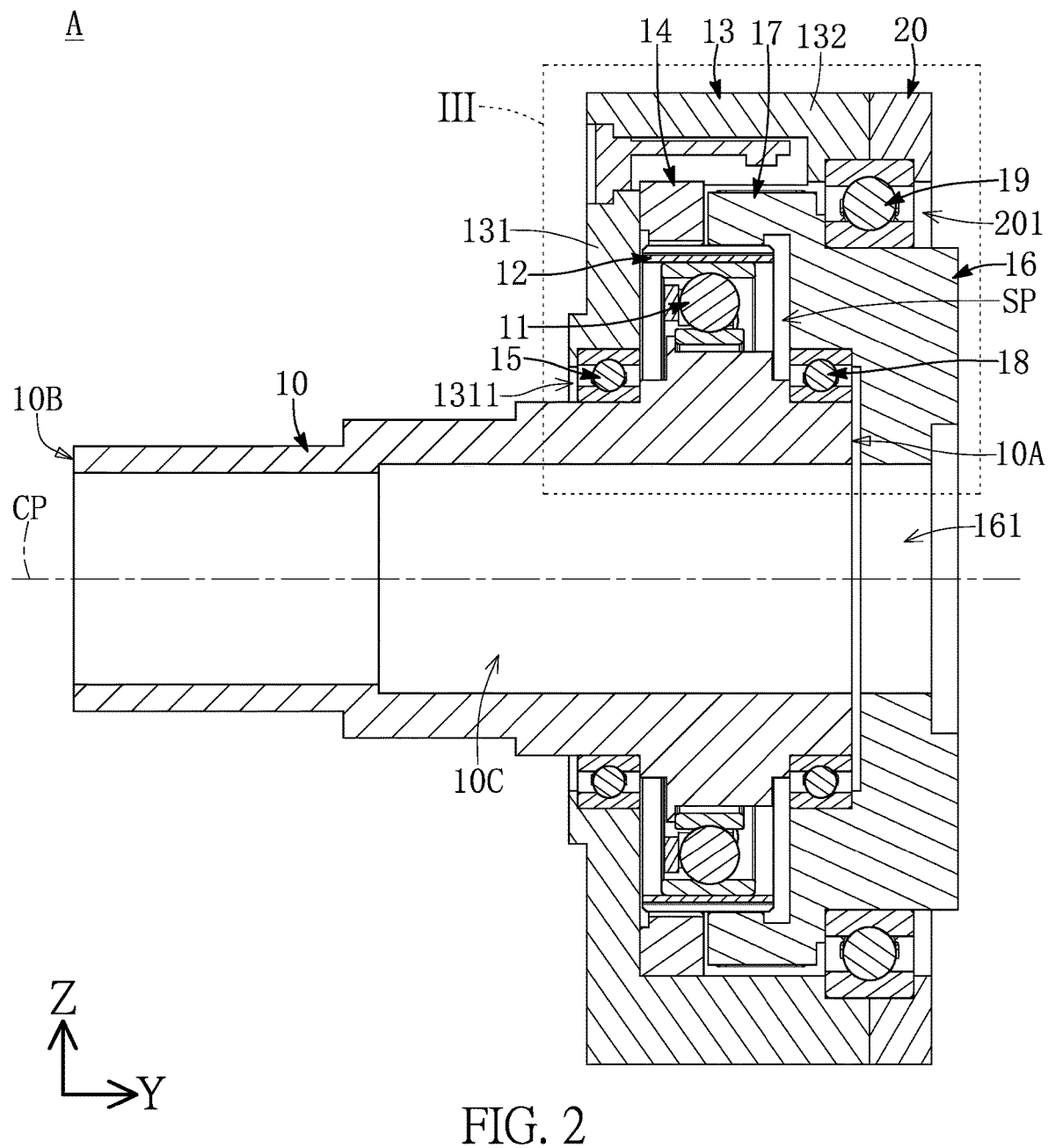
FIG. 2 is a cross-sectional view taken along line II-II of FIG. 1.
Figure 3:
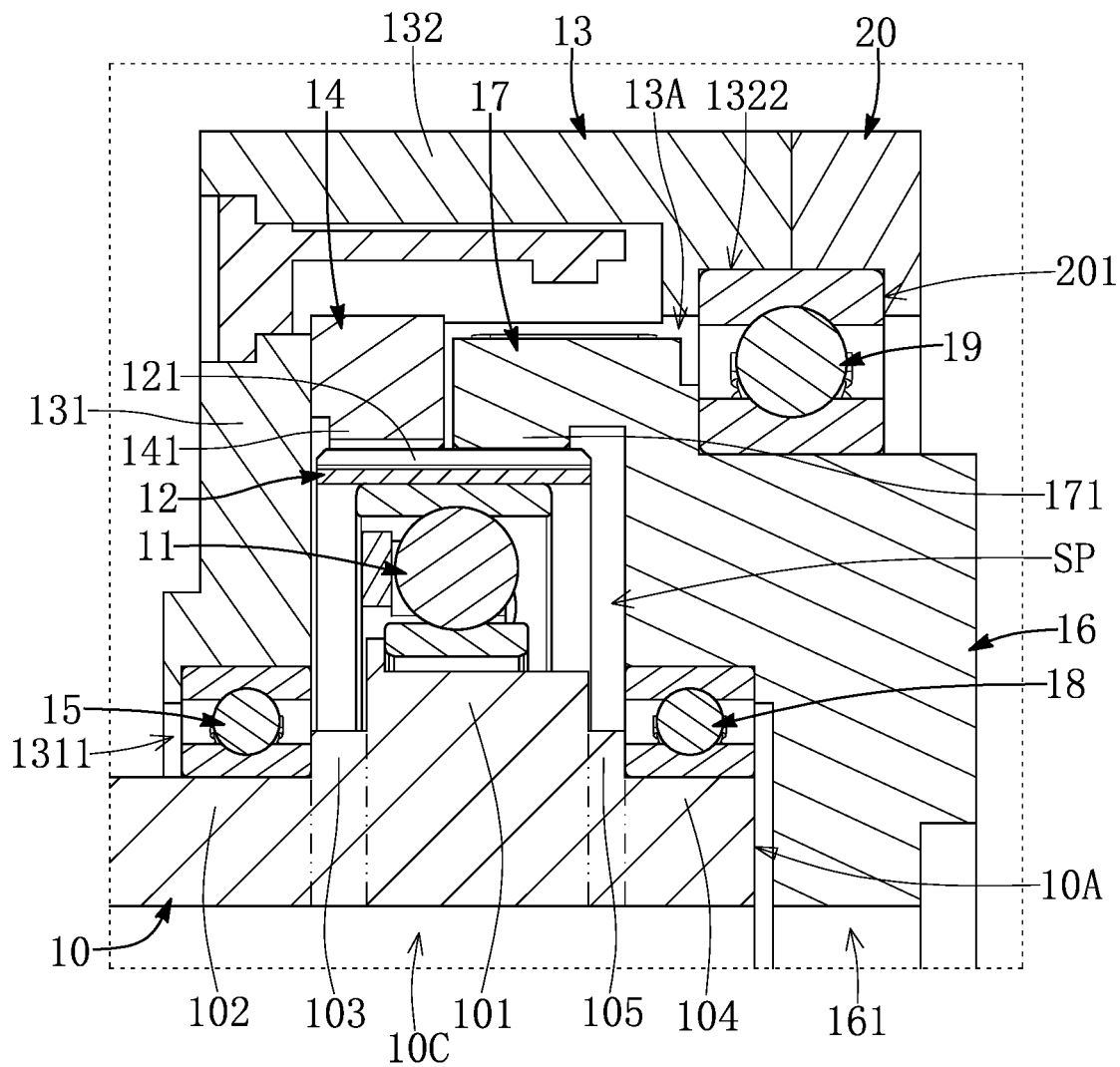
FIG. 3 is an enlarged view of part III of FIG. 2.
Figure 4:
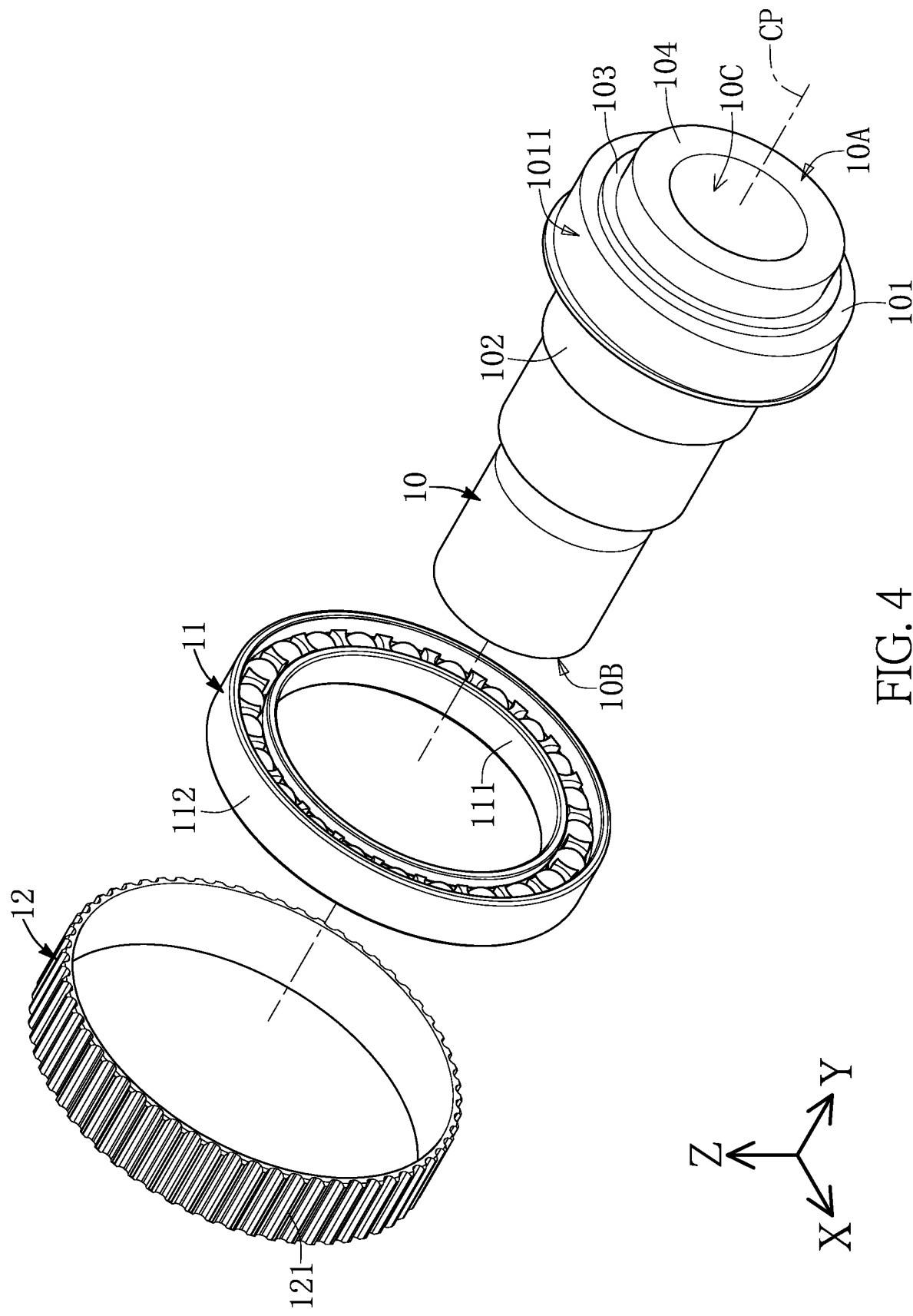
FIG. 4 to FIG. 7 are partial exploded views of different members of the harmonic deceleration module according to the present disclosure.
Figure 5:
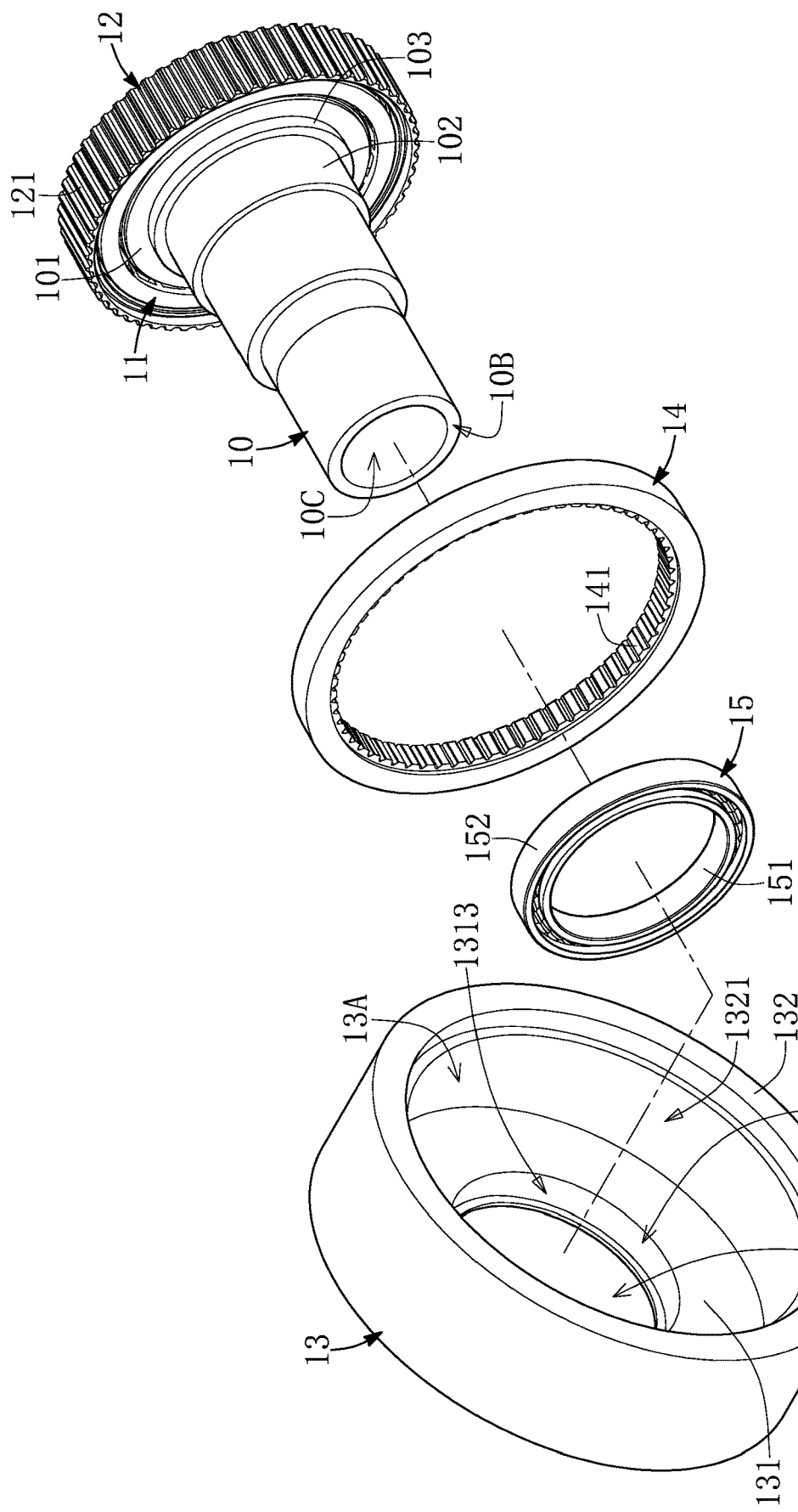
Figure 6:
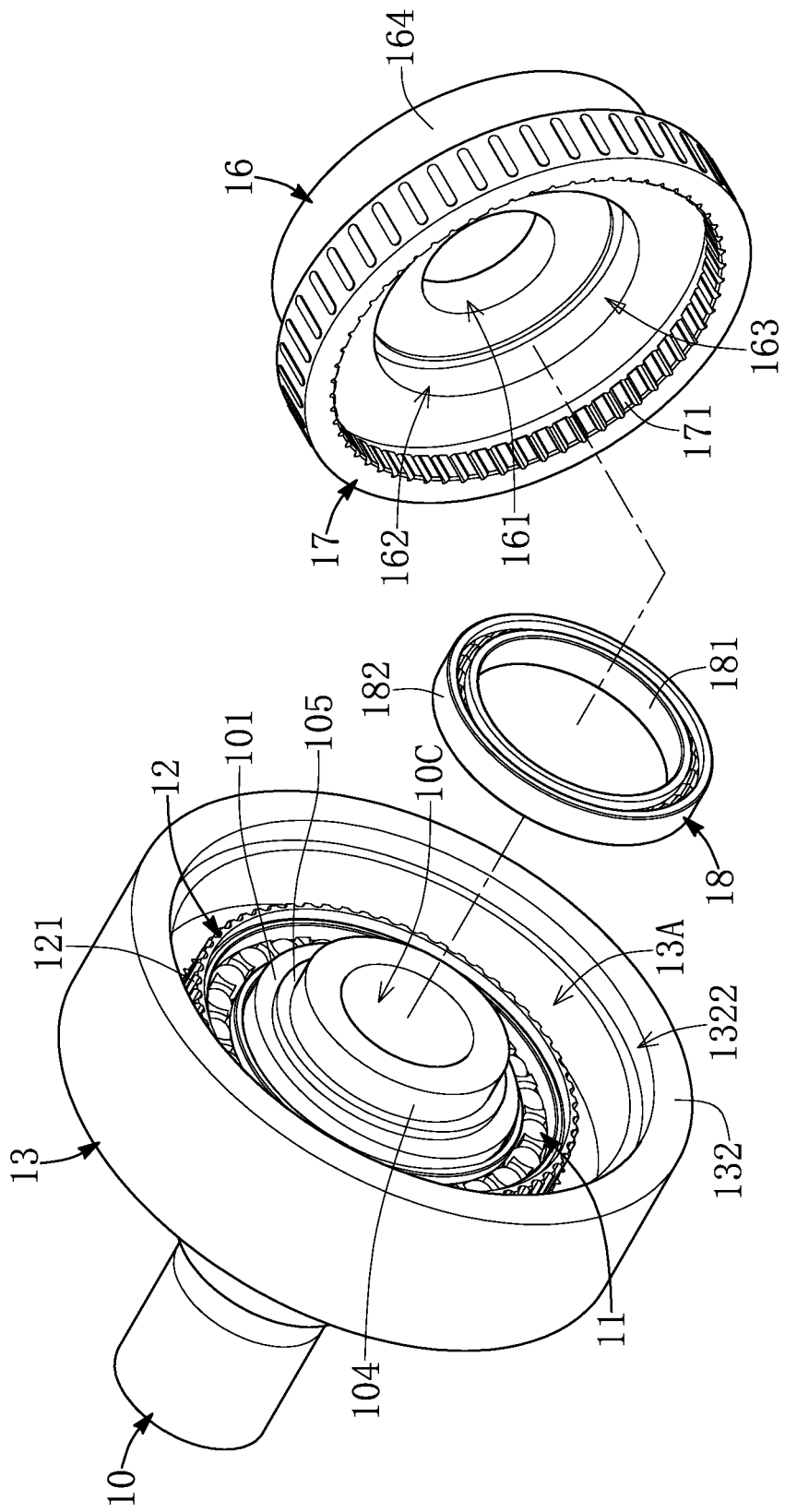

As shown in FIG. 2, FIG. 3 and FIG. 5, the first frame 13 can have a frame body 131 and a ring-side wall 132, the ring-side wall 132 is connected to a surrounding edge of the frame body 131, and the frame body 131 and the ring-side wall 132 jointly form a container 13A. The frame body 131 can have a through hole 1311 and an inner bearing chamber 1312, and the through hole 1311 penetrates through the frame body 131 along a central axis CP.

The inner bearing chamber 1312 is formed by being recessed in a side of the frame body 131 adjacent to the ring-side wall 132, and the through hole 1311 and the inner bearing chamber 1312 are communicated with each other. The ring-side wall 132 has an edge that is away from a side of the frame body 131 and can be recessed in to form an outer bearing groove 1322, and the outer bearing groove 1322 and the container 13A are communicated with each other. In practice, the frame body 131 can be a circular plate structure.

The first circular spline 14 is a ring-shaped structure and has a plurality of first inner gear-shaped structures 141 formed on an inner side thereof, and a periphery of the first circular spline 14 and an inner side 1321 of the ring-side wall 132 of the first frame 13 are fixed to each other. In practice, the first circular spline 14 and the first frame 13 can be two separate members and be fixed to each other by using suitable techniques (e.g., locking, gluing, welding, etc.), but it is not limited thereto. In different embodiments, the first circular spline 14 and the first frame 13 can be integrally formed.

The first bearing 15 is disposed inside of the inner bearing chamber 1312, the first bearing 15 has an inner ring 151 and an outer ring 152, the inner ring 151 of the first bearing 15 and a periphery of the connecting member 10 are fixed to each other, and the outer ring 152 of the first bearing 15 and an inner side wall 1313 of the inner bearing chamber 1312 forming the frame body 131 are fixed to each other. The connecting member 10 and the first frame 13 are pivotally connected to each other by the first bearing 15, and the first bearing 15 is configured to enable the connecting member 10 to be pivotally connected to the first frame 13. In practice, the first bearing 15 can be replaced with any assemblies that can achieve the same function.

As shown in FIG. 2 and FIG. 3, after the first frame 13 provided with the first circular spline 14 and the connecting member 10 are pivotally connected to each other by the first bearing 15, the first inner gear-shaped structures 141 of the first circular spline 14 and a part of the outer gear-shaped structures 121 of the flexspline 12 are meshed with each other, and one side of the first bearing 15 correspondingly abuts one side of the first annular limiting part 103.

By the first annular limiting part 103, when the first frame 13 provided with the first bearing 15 is fitted into the connecting member 10 from the second end 10B thereof, the first bearing 15 is fixed to the first annular part 102, and the one side of the first bearing 15 abuts the side of the first annular limiting part 103. At this time, a user can clearly know that the first bearing 15 and the first frame 13 that are fixed to each other have been mounted in a correct position on the connecting member 10.

As shown in FIG. 2, FIG. 3, FIG. 6, and FIG. 7, the second frame 16 has a hollow channel 161 penetrating through the second frame 16 along the central axis CP, a side of the second frame 16 is recessed in to form a bearing chamber 162, and the bearing chamber 162 and the hollow channel 161 are communicated with each other. The second bearing 18 is disposed in the bearing chamber 162. The second bearing 18 has an inner ring 181 and an outer ring 182, the inner ring 181 of the second bearing 18 and a periphery of the second annular part 104 of the connecting member 10 are fixed to each other, and the outer ring 182 of the second bearing 18 and an inner side wall 163 of the bearing chamber 162 forming the second frame 16 are fixed to each other. The second frame 16 is pivotally connected to the periphery of the connecting member 10 by the second bearing 18. The second bearing 18 is mainly configured to enable the connecting member 10 and the second frame 16 to be pivotally connected to each other. In practice, the second bearing 18 can be replaced with any assemblies that can perform the same function. In different embodiments, the second frame 16 can be without the hollow channel 161.

In practice, the connecting member 10 can have a connecting channel 10C penetrating through the connecting member 10 along the central axis CP, and the hollow channel 161 and the connecting channel 10C are communicated with each other, such that the hollow channel 161 and the connecting channel 10C can be configured for having relevant wires and other components to be disposed thereto. Naturally, the connecting member 10 is not limited to having the connecting channel 10C, in different embodiments, the connecting member 10 can be a solid member without the connecting channel 10C.

The second circular spline 17 is a ring-shaped structure and has a plurality of second inner gear-shaped structures 171 formed on an inner side thereof. A part of the second circular spline 17 and a periphery 164 of the second frame 16 are fixed to each other. In practice, the second frame 16 and the second circular spline 17 can be integrally formed, but it is not limited thereto. In different embodiments, the second frame 16 and the second circular spline 17 can be two separate members that are fixed to each other by using suitable techniques (e.g., locking, gluing, welding, etc.).

When the second frame 16 is pivotally connected to the periphery of the connecting member 10 by the second bearing 18, the second inner gear-shaped structures 171 and the outer gear-shaped structures 121 of the flexspline 12 are meshed with each other. That is, a part of the outer gear-shaped structures 121 of the flexspline 12 and the second inner gear-shaped structures 171 of the second circular spline 17 are meshed with each other, and another part of the outer gear-shaped structures 121 and the first inner gear-shaped structures 141 of the first circular spline 14 are meshed with each other.

It is worth mentioning that the second frame 16 having the second circular spline 17 is pivotally connected to the connecting member 10 through the second bearing 18, and one side of the second bearing 18 correspondingly abuts to one side of the second annular limiting part 105. By the second annular limiting part 105, when the second frame 16 having the second bearing 18 is fitted into the connecting member 10 from the first end 10A thereof, the second bearing 18 is fixed to the second annular part 104, and the one side of the second bearing 18 abuts the one side of the second annular limiting part 105. At this time, the user can clearly know that the second bearing 18 and the second frame 16 fixed to each other have been mounted in a correct position on the connecting member 10.

When the second frame 16 and the second circular spline 17 are mounted in the first annular part 102 of the connecting member 10 through the second bearing 18, the second circular spline 17 is correspondingly located in the container 13A of the first frame 13, a part of the periphery 164 of the second frame 16 corresponds to an exposed end of the first frame 13, and the outer bearing groove 1322 of the first frame 13 is disposed adjacent to the periphery 164 of the second frame 16.

A part of the third bearing 19 is disposed inside the outer bearing groove 1322, the third bearing 19 has an inner ring 191 and an outer ring 192, the inner ring 191 of the third bearing 19 and the periphery 164 of the second frame 16 are fixed to each other, and a part of the outer ring 192 of the third bearing 19 and an inner side wall 1323 of the outer bearing groove 1322 forming the first frame 13 are fixed to each other.

The end cap 20 has a through hole 201 penetrating through the end cap 20 along the central axis CP, and one side of the end cap 20 is recessed in to form a bearing groove 202. An end face of the end cap 20 formed with a bearing groove 202 and an end face of the first frame 13 formed with the outer bearing groove 1322 are fixed to each other.

Another part of the outer ring 192 of the third bearing 19 and an inner side wall 203 of the bearing groove 202 forming the end cap 20 are fixed to each other, and the second frame 16 can rotate relative to the first frame 13 and the end cap 20 by the first bearing 15. The third bearing 19 is mainly configured to enable the second frame 16 to be pivotally connected to the first frame 13 and the end cap 20, and in practice, the third bearing 19 can be replaced with any members that can perform the same function.

As shown in FIG. 2 and FIG. 3, it is worth mentioning that the connecting member 10, the first bearing 15, the first frame 13, the second frame 16, the second bearing 18, the third bearing 19, and the end cap 20 define an enclosed space SP, and the flexible bearing 11, the flexspline 12, the first circular spline 14, and the second circular spline 17 are correspondingly located in the enclosed space SP.

Accordingly, the dust and the dirt outside the harmonic deceleration module A can be prevented from easily entering among the outer gear-shaped structures 121, the first inner gear-shaped structures 141, and the second inner gear-shaped structures 171, and the service life of the flexspline 12, the first circular spline 14, and the second circular spline 17 can be further extended.

In practice, a quantity of the first inner gear-shaped structures 141 of the first circular spline 14 is equal to the quantity of the outer gear-shaped structures 121 of the flexspline 12, and a quantity of the second inner gear-shaped structures 171 of the second circular spline 17 is greater than the quantity of the outer gear-shaped structures 121 of the flexspline 12. In one of the embodiments, a difference between the quantity of the first inner gear-shaped structures 141 of the first circular spline 14 and the second inner gear-shaped structures 171 of the second circular spline 17 is less than five.

In practice, the connecting member 10 of the harmonic deceleration module A of the present embodiment is configured to be connected to an external driving unit (e.g., a motor), the second frame 16 is configured to be connected to an external output member, and the dynamic power output from the external driving unit can be transferred to the external output member by the harmonic deceleration module A of the present disclosure.

More specifically, when the connecting member 10 is driven to rotate around the central axis CP, the cam part 101 of the connecting member 10 drives the flexible bearing 11 to rotate, and the cam part 101 and the flexible bearing 11 jointly form the wave generator. The wave generator drives the flexspline 12 to continually and flexibly deform, and a part of the outer gear-shaped structures 121 of the flexspline 12 and a part of the first inner gear-shaped structures 141 of the first circular spline 14 are meshed with each other.

Since the quantity of the first inner gear-shaped structures 141 of the first circular spline 14 is equal to the quantity of the outer gear-shaped structures 121 of the flexspline 12, therefore, when the flexspline 12 is driven to continually and flexibly deform by the wave generator, the flexspline 12 does not rotate relative to the first circular spline 14, and a part of the outer gear-shaped structures 121 of the flexspline 12 and a part of the second inner gear-shaped structures 171 of the second circular spline 17 are meshed with each other.

Since the quantity of the outer gear-shaped structures 121 of the flexspline 12 is not equal to the quantity of the second inner gear-shaped structures 171 of the second circular spline 17, therefore, the second circular spline 17 is driven to rotate by the flexspline 12 that is continually and flexibly deformed, and the second frame 16 rotates with the second circular spline 17. By having the flexspline 12, the first circular spline 14, and the second circular spline 17, the high speed power input by the connecting member 10 is output by the second frame 16 at a relatively low speed.

It is worth mentioning that the conventional flexspline of the conventional harmonic deceleration module is generally in the shape of a cap or a cup. In addition to a part of the outer gear-shaped structures of the periphery of the flexspline, the periphery of the flexspline further has a part without the outer gear-shaped structures. Conversely, the periphery of the flexspline 12 of the harmonic deceleration module A of the present disclosure only has the outer gear-shaped structures 121.

Accordingly, an axial length of the flexspline 12 (in the Y-axis direction as shown in FIG. 2) of the harmonic deceleration module A of the present disclosure is less than an axial length of the conventional flexspline that is cap-shaped or cup-shaped. The overall volume of the harmonic deceleration module A of the present disclosure is less than the overall volume of the conventional harmonic deceleration module.

By virtue of technical means such as "the connecting member 10 and the second frame 16 rotating around the same central axis CP", the harmonic deceleration module A of the present disclosure can have better dynamic characteristics and less vibration noise.

It should be noted that, in the drawings of the present embodiment, the flexible bearing 11, the first bearing 15, the second bearing 18, and the third bearing 19 are all ball bearings for example, but the flexible bearing 11, the first bearing 15, the second bearing 18, and the third bearing 19 are not limited to being ball bearings, and their form can be chosen according to practical requirements, for example, they can also be roller bearings. In addition, in practice, oil seals can be disposed around the first bearing 15 and the third bearing 19, accordingly, external pollution outside of the enclosed space SP can be prevented from entering the closed space SP.

Referring to FIG. 8 to FIG. 12, the present disclosure provides an automatic mobile vehicle B including a main body B1, four wheels B2, a processing module B3, and a dynamic power device C, and the main body B1 can be used to carry cargos or passengers, etc. according to requirements. The processing module B3 is disposed in the main body B1, at least a part of the dynamic power device C is disposed in the main body B1, and the dynamic power device C is connected to at least one of the wheels B2.

The main body B1 includes relevant electronic parts and mechanical parts necessary for the automatic mobile vehicle B to normally operate, the processing module B3 is electrically connected to the dynamic power device C, and the processing module B3 is configured to control the dynamic power device C to drive the wheels B2. The processing module B3 can, for example, include circuit boards, microprocessors, and other relevant electronic components necessary to control the operation of the dynamic power device C.

The automatic mobile vehicle B of the present disclosure can, for example, be applied as an automated guided vehicle (AGV), but it is not limited thereto. The automatic mobile vehicle B of the present disclosure refers to any vehicle with automatic travel function for carrying passengers or cargos. In addition, a quantity of the wheels B2 of the automatic mobile vehicle B of the present disclosure and a quantity of the dynamic power device C of the automatic mobile vehicle B of the present disclosure can be varied according to practical requirements.

As shown in FIG. 9 to FIG. 12, the dynamic power device C of the present disclosure includes a driving unit C1, an outer housing C2, a harmonic deceleration module A, and an outer end cap C3. The outer housing C2 is a hollow structure, the harmonic deceleration module A and the driving unit C1 are disposed in the outer housing C2, and the outer end cap C3 is fixed on one end of the outer housing C2.

The harmonic deceleration module A includes a connecting member 10, a flexible bearing 11, a flexspline 12, a first frame 13, a first circular spline 14, a first bearing 15, a second frame 16, a second circular spline 17, a second bearing 18, a third bearing 19, and an end cap 20. The connection and operation relationship between the components mentioned above can be referred to in preceding embodiments and will not be reiterated herein.

The driving unit C1 is connected to the connecting member 10, the driving unit C1 is electrically connected to the processing module B3, and the processing module B3 can control the driving unit C1 to drive the connecting member 10 to rotate around the central axis CP. More specifically, the driving unit C1 can be, for example, a motor including a stator assembly C11 and a rotor assembly C12. The stator assembly C11 is fixed on an inner side of the outer housing C2, and the rotor assembly C12 is fixed on the periphery of the connecting member 10.

In practice, the rotor assembly C12 can be disposed adjacent to the second end 10B of the connecting member 10, and the rotor assembly C12 can be located on a side of the first frame 13 of the harmonic deceleration module A. In one of the embodiments, the rotor assembly C12 includes an iron core and a plurality of magnets, the iron core of the rotor assembly C12 can be fitted to the periphery of the connecting member 10, or the magnets of the rotor assembly C12 can be arranged in a ring around the periphery of the connecting member 10. By virtue of technical means such as "the rotor assembly C12 being fixed on the periphery of the connecting member 10", the rotor assembly C12 and the connecting member 10 rotate around the same central axis CP when the rotor assembly C12 and the connecting member 10 are in operation.

Accordingly, the size of the dynamic power device C can be greatly reduced. Compared with the assembly manner in which the magnets of the rotor assembly C12 is arranged in a ring around the periphery of the connecting member 10, the assembly manner in which the iron core of the rotor assembly C12 is fitted to the periphery of the connecting member 10 can further reduce the assembly tolerance between the rotor assembly C12 and the connecting member 10, the deformation of the connecting member 10 during the fitting process can be avoided, and the rate of a one-time successful assembly of the rotor assembly C12 and the connecting member 10 (commonly known as a straight-through rate) can be increased.

Figure 8:
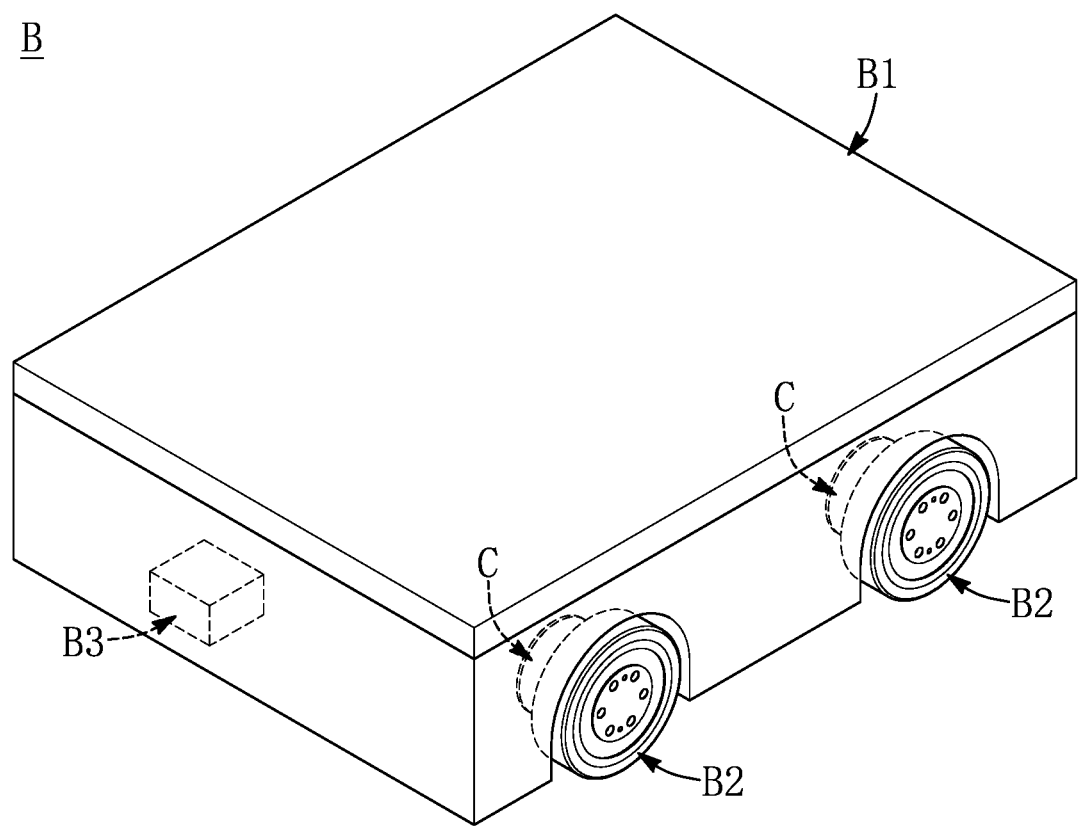
FIG. 8 is a schematic view of an automatic mobile vehicle according to the present disclosure.
Figure 9:
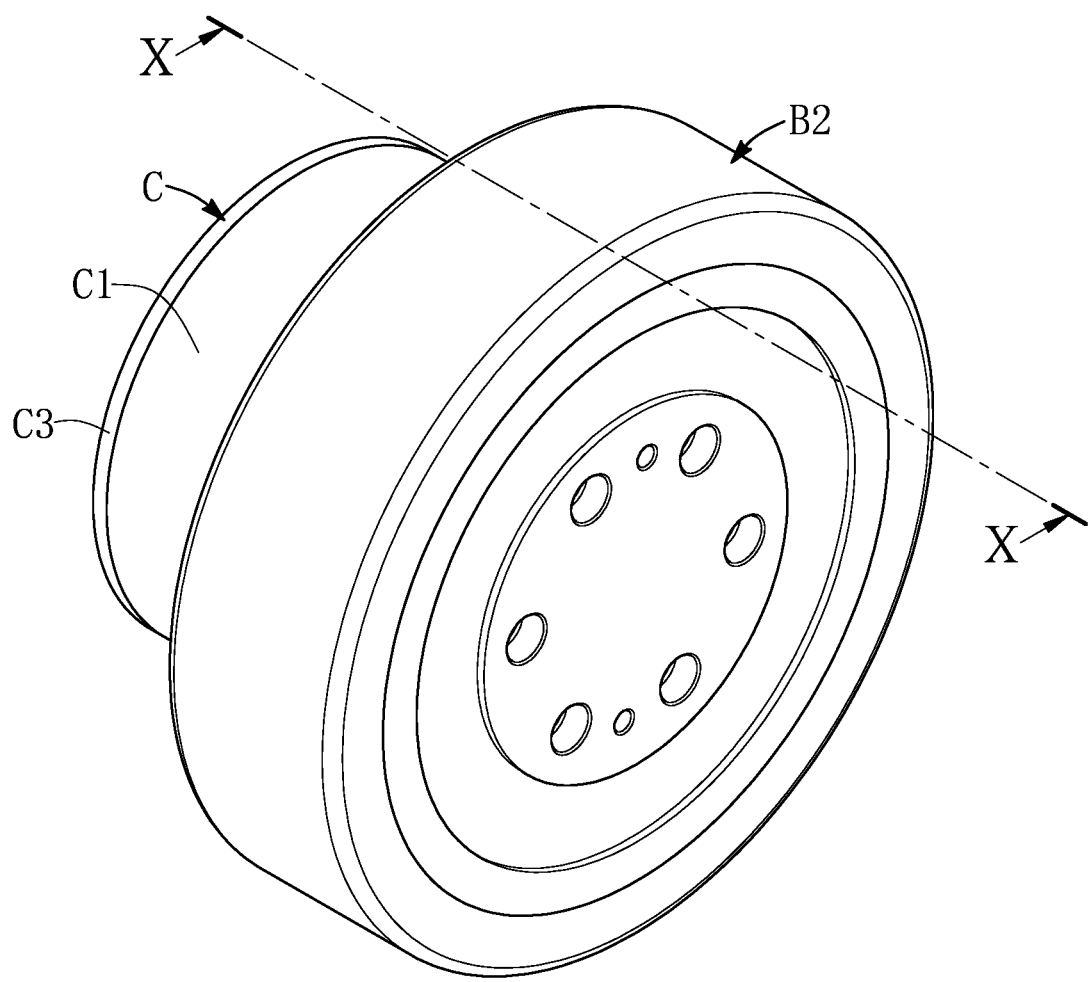
FIG. 9 is a partial schematic view of the automatic mobile vehicle according to the present disclosure.
Figure 10:
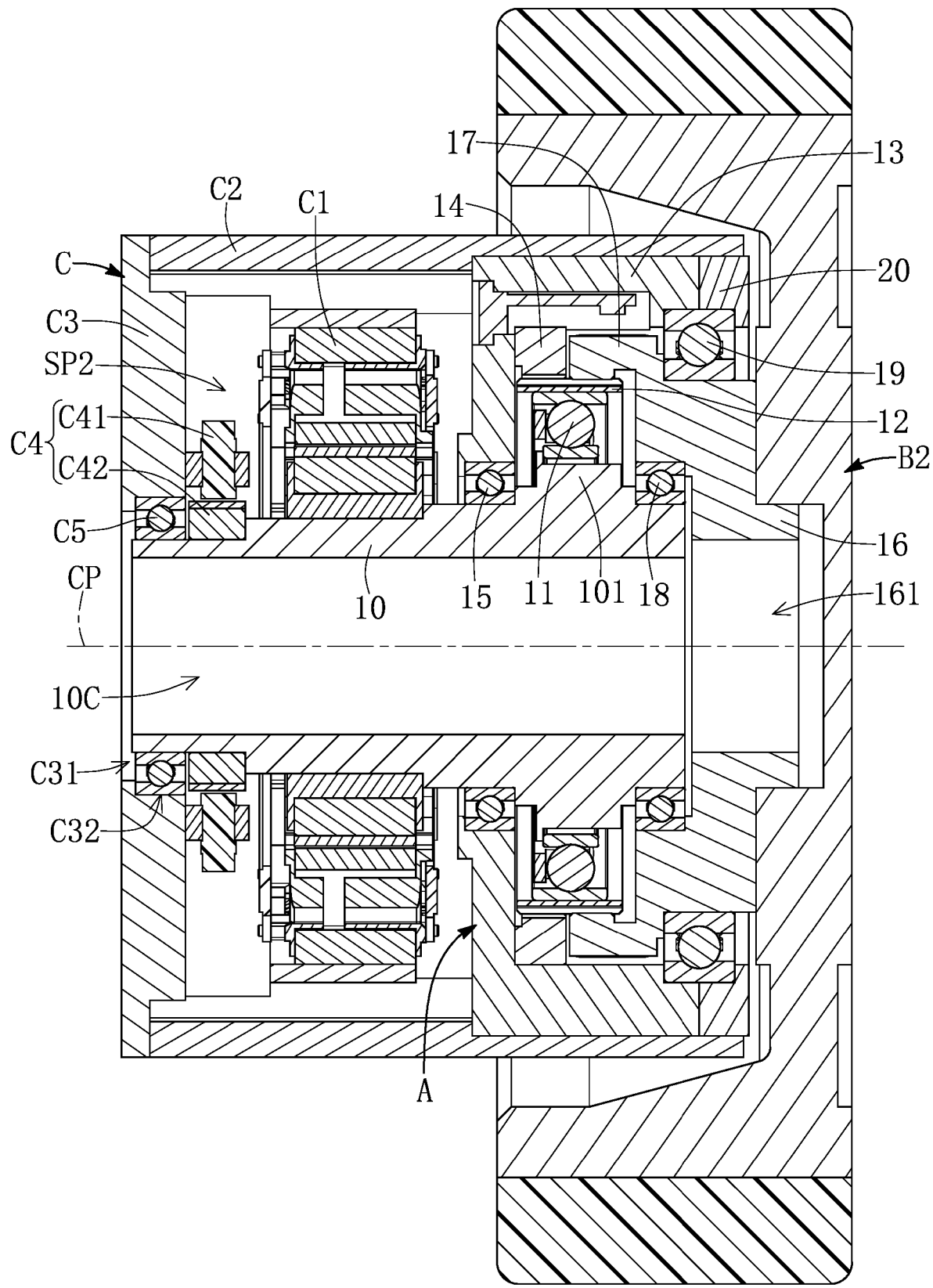
FIG. 10 is a cross-sectional view taken along line X-X of FIG. 9.
Figure 11:
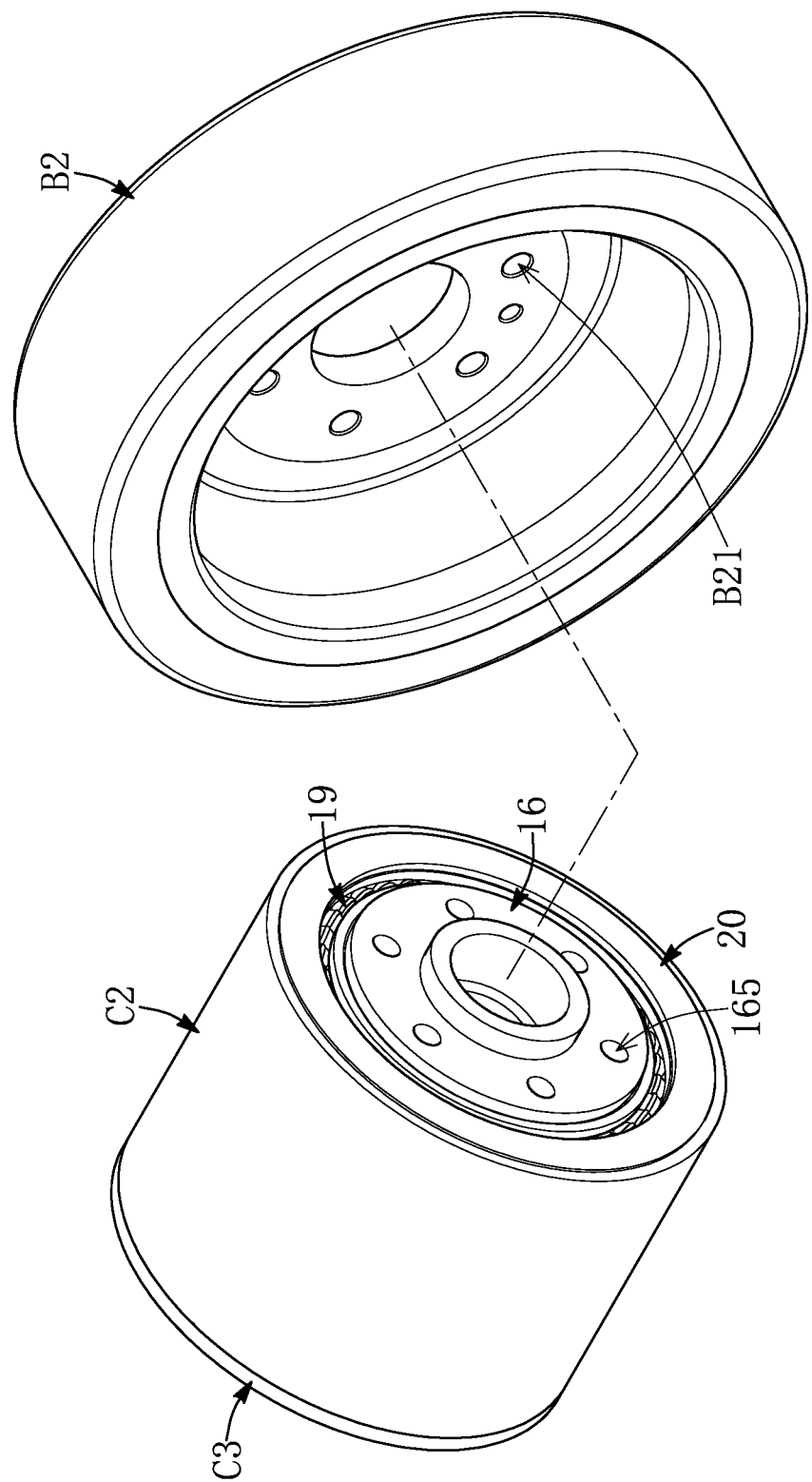
FIG. 11 is an exploded view of a dynamic power device and a wheel of the automatic mobile vehicle according to the present disclosure.

As shown in FIG. 8 to FIG. 10, the harmonic deceleration module A is disposed in the outer housing C2, the first frame 13 and the end cap 20 of the harmonic deceleration module A can directly be interlocked with the inner side of the outer housing C2, and the end cap 20 of the harmonic deceleration module A can correspondingly be disposed adjacent to the one end of the outer housing C2.

The second frame 16 of the harmonic deceleration module A is connected to one of the wheels B2, and the second frame 16 can drive the wheel B2 to rotate. In practice, the second frame 16 and the wheel B2 can respectively have a plurality of tapped holes 165 and a plurality of tapped holes B21 corresponding to each other, and the tapped holes 165 of the second frame 16 and the tapped holes B21 of the wheel B2 can be interlocked in cooperation with the plurality of screws such that the second frame 16 and the wheel B2 are fixed to each other.

In preferred embodiments, the harmonic deceleration module A and the outer housing C2 can be fixed to each other in a reversible and disassembled manner, and the driving unit C1 and the connecting member 10 can be connected to each other in a reversible and disassembled manner. Therefore, when the harmonic deceleration module A of the dynamic power device C fails, the harmonic deceleration module A of the dynamic power device C can be replaced through simple disassembly and assembly operations.

In different embodiments, the dynamic power device C can include two outer end caps C3 respectively disposed on two ends of the outer housing C2, and the end cap 20 of the harmonic deceleration module A is basically located in the outer housing C2. Naturally, the outer end caps C3 of the second frame 16 adjacent to the harmonic deceleration module A have through holes, and the second frame 16 and the wheel B2 can be connected to each other through the through holes of the outer end caps C3.

The dynamic power device C further includes at least one sensor that is configured to sense at least one of a torque, a speed, and a position of the connecting member 10 when the connecting member 10 rotates. For example, the least one sensor can be a torque sensor or a speed sensor, but it is not limited thereto. In one of the embodiments, the least one sensor can be a rotary encoder C4 including a scanning unit C41 and a magnetic ring C42, the scanning unit C41 can be fixedly disposed on the outer end cap C3, and the magnetic ring C42 can be fixedly disposed on the periphery of the connecting member 10.

The scanning unit C41 is electrically connected to the processing module B3, the scanning unit C41 can cooperate with the magnetic ring C42 to generate corresponding signals and transmit them to the processing module B3, and the processing module B3 can analyze a rotational speed, a rotational position, and other information of the connection member 10 accordingly.

Figure 12:
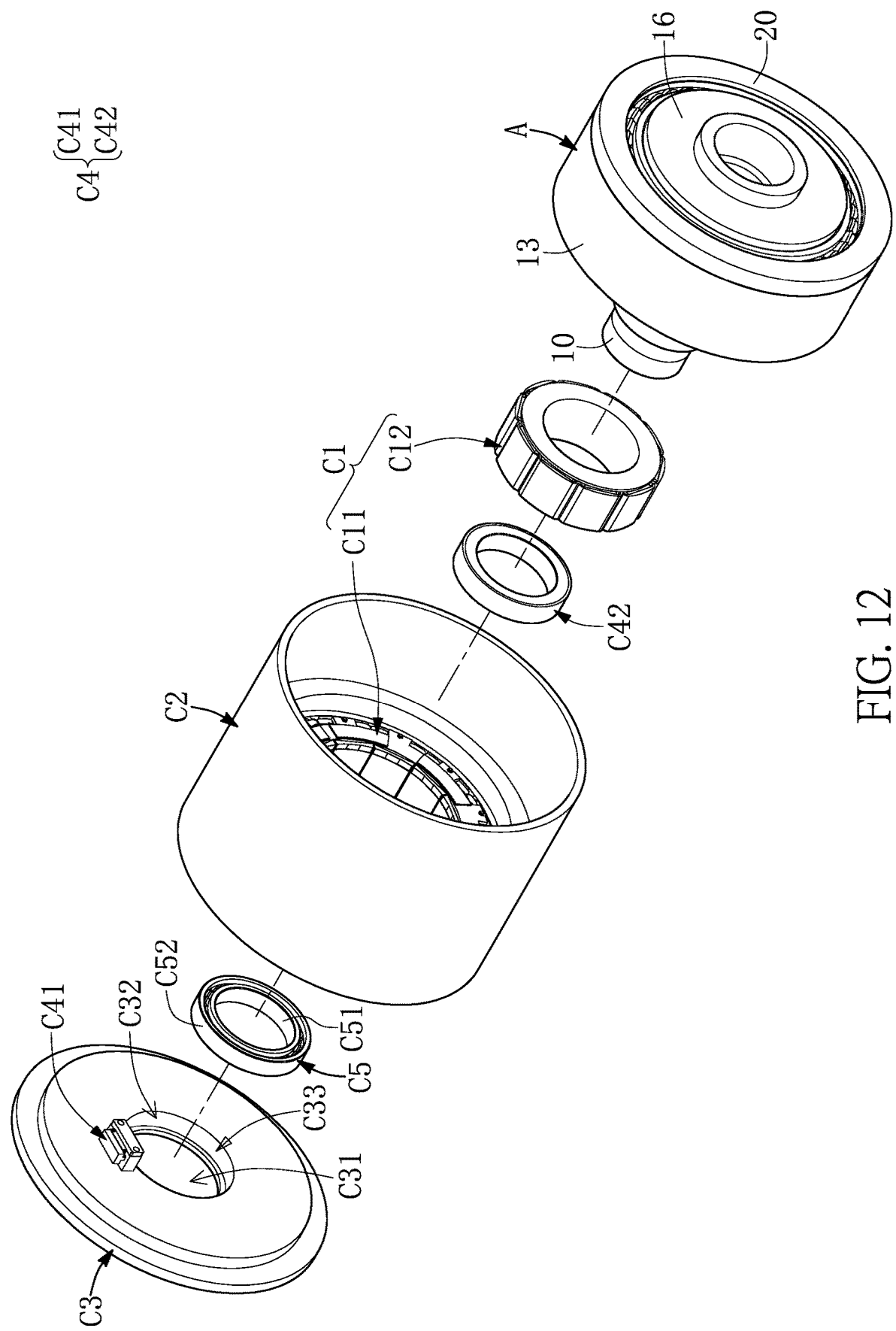
FIG. 12 and FIG. 13 are respectively partial exploded views from different viewing angles of the dynamic power device of the automatic mobile vehicle according to the present disclosure.
Figure 13:
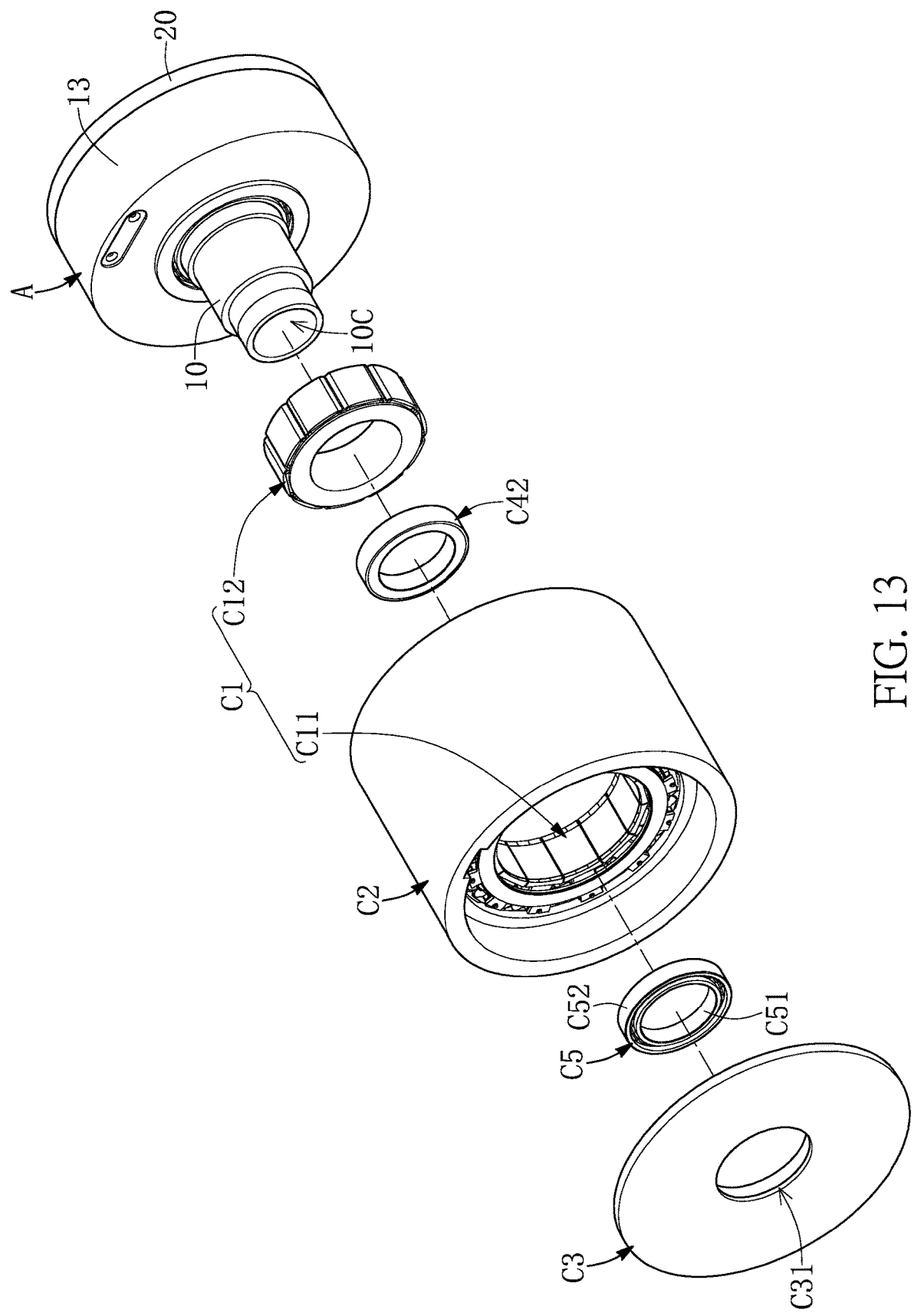

As shown in FIG. 10, FIG. 12, and FIG. 13, in one of the embodiments, the outer end cap C3 can have a through hole C31 penetrating through the outer end cap C3, and a side of the outer end cap C3 can be recessed in to form a bearing groove C32. The dynamic power device C further can include an auxiliary bearing C5, the auxiliary bearing C5 has an inner ring C51 and an outer ring C52, the inner ring C51 of the auxiliary bearing C5 and the periphery of the connecting member 10 are fixed to each other, the outer ring C52 of the auxiliary bearing C5 and an inner side wall C33 forming the bearing groove C32 are fixed to each other, and the connecting member 10 can rotate relative to the outer end cap C3 by the auxiliary bearing C5.

In addition, the connecting channel 10C of the connecting member 10 and the through hole C31 of the outer end cap C3 can be communicated with each other, the relevant wires correspondingly included in the driving unit C1 and the sensors can pass through the through hole C31 of the outer end cap C3 and be disposed in the connecting channel 10C. The auxiliary bearing C5, the outer end cap C3, the outer housing C2, the first bearing 15, and the first frame 13 define an enclosed space SP2, and the driving unit C1 is correspondingly disposed in the enclosed space SP2.

Figure 7:
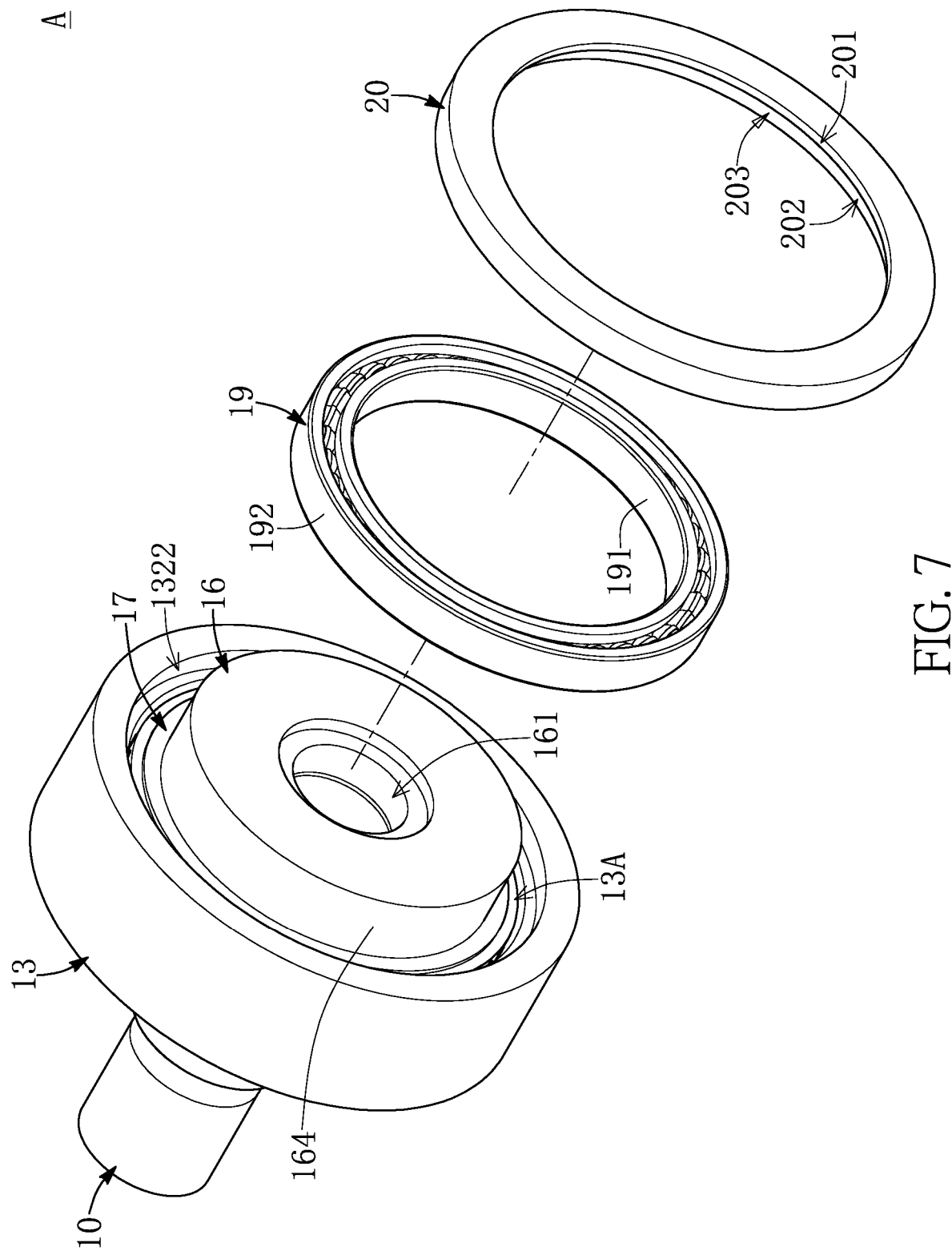

Accordingly, as shown in FIG. 7 and FIG. 10, when the processing module B3 drives the driving unit C1, the driving unit C1 drives the connecting member 10 to rotate such that the harmonic deceleration module A is driven. Finally, the wheel B2 is driven to rotate by the second frame 16.

Figure 14:
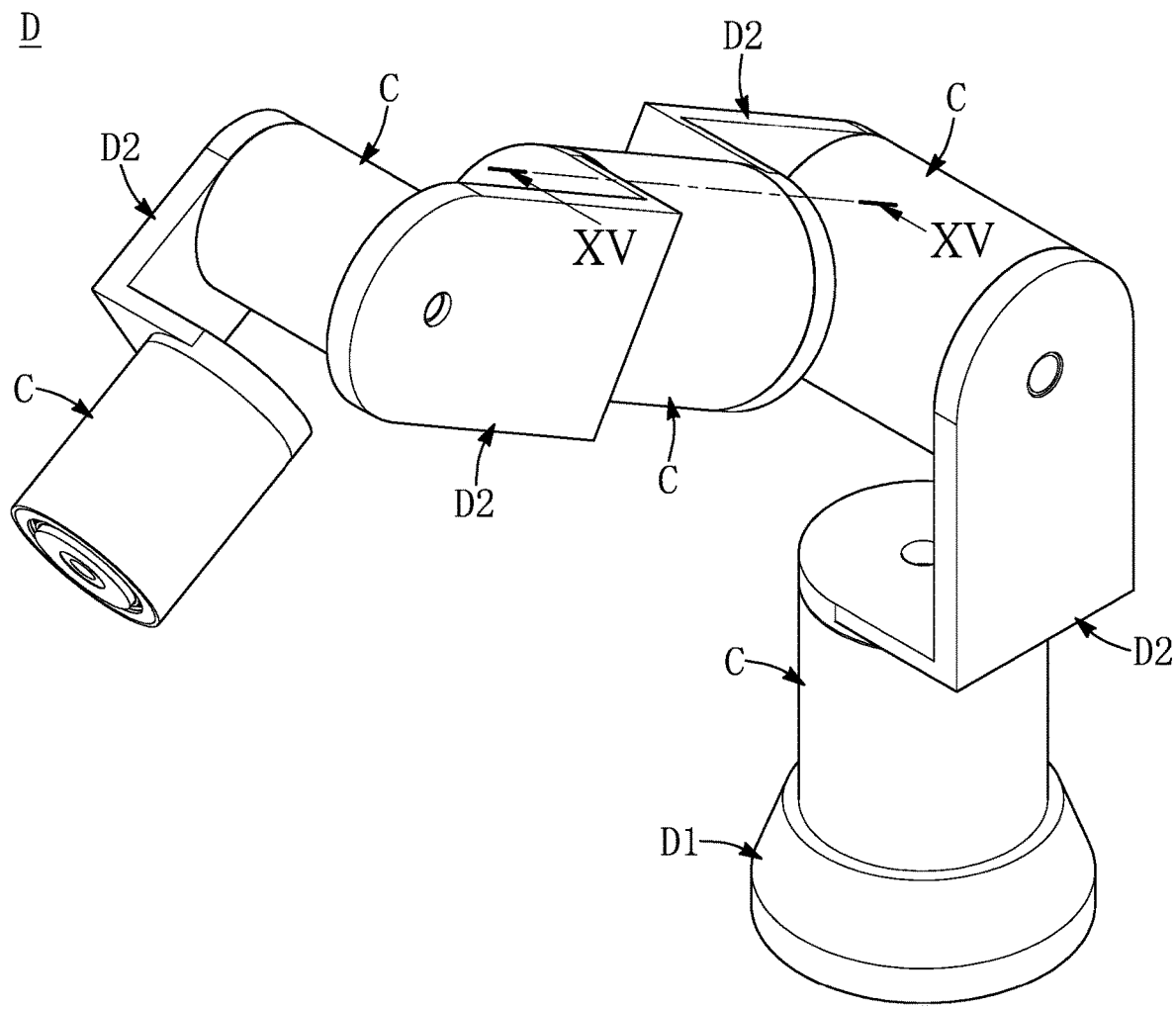
FIG. 14 is a schematic view of a transfer apparatus according to the present disclosure.
Figure 15:
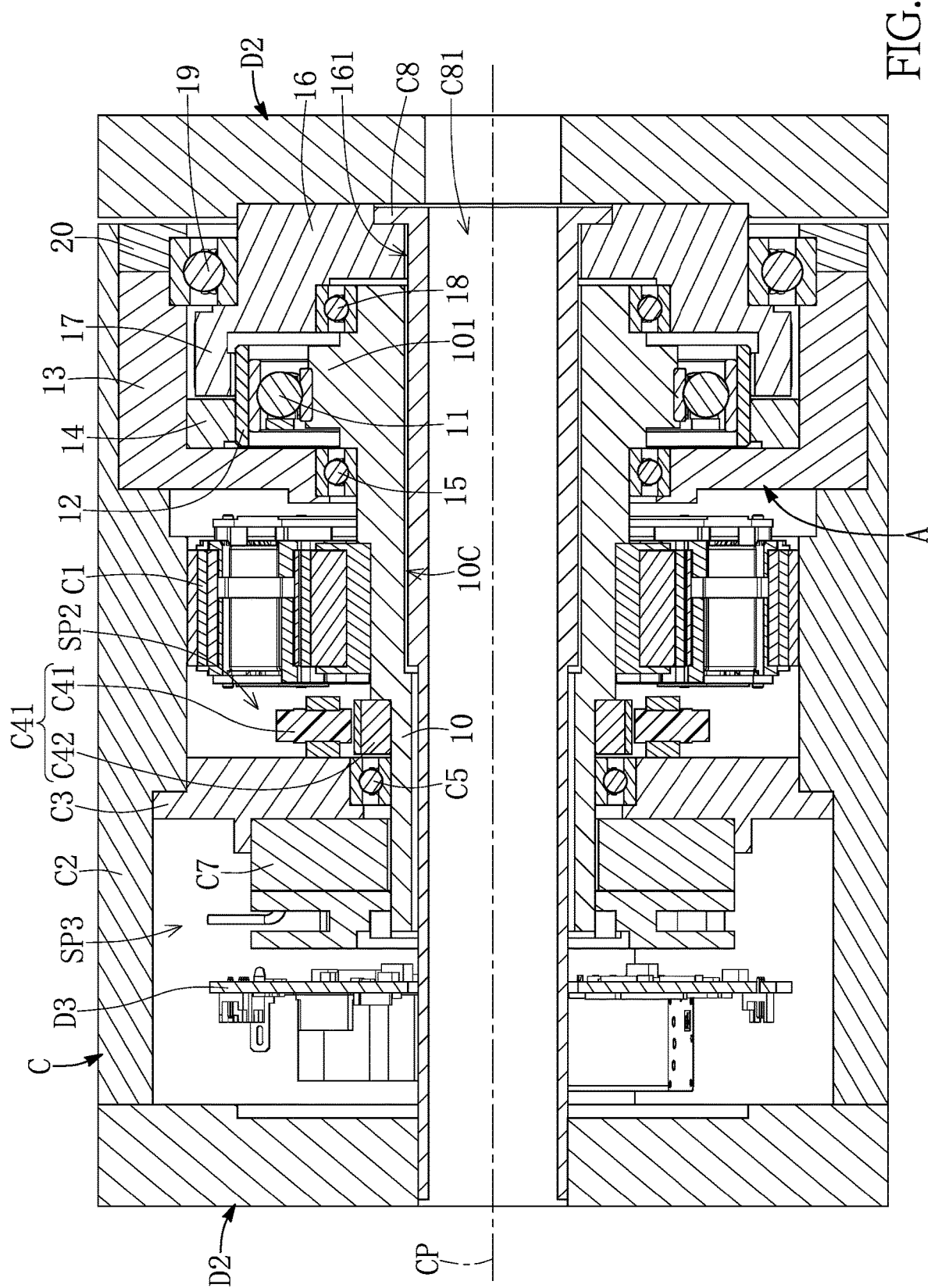
FIG. 15 is a cross-sectional view taken along line XV-XV of FIG. 14.

Referring to FIG. 14 and FIG. 15, the present disclosure provides a transfer apparatus D, and the transfer apparatus D includes a base D1, five of the dynamic power devices C, four connecting assemblies D2, and five processing modules D3. The transfer apparatus D can be applied as a robotic arm, but it is not limited thereto. A quantity of the dynamic power devices C, a quantity of the connecting assemblies D2, and a quantity of the processing modules D3 of the transfer apparatus D can be varied according to practical requirements, and it is not limited to those as shown in the drawings of the present disclosure. In addition, the size and the shape of the connecting assemblies D2 can be changed according to practical requirements, and it is not limited to those as shown in the drawings of the present disclosure.

The base D1 is configured to be disposed on the ground, the base D1 is connected to one end of one of the dynamic power devices C, another end of the dynamic power devices C is connected to one end of one of the connecting assemblies D2, and another end of the one of the connecting assemblies D2 is connected to another one of the dynamic power devices C, and so on.

The detailed description of the dynamic power devices C can be referred to in the preceding embodiments and will not be reiterated herein. Each of the processing modules D3 is electrically connected to one of the dynamic power devices C, and the processing modules D3 can control the dynamic power devices C connected thereto to relatively drive the connecting assemblies D2. In practice, the second frame 16 of the dynamic power device C located at an end of the transfer apparatus D can be connected to a clamping member according to practical requirements, and it is not limited thereto.

As shown in FIG. 15, the second frame 16 of the dynamic power device C can be exposed at one end of the outer housing C2 and be connected to one of the connecting assemblies D2, and another end of the outer housing C2 can be connected to another one of the connecting assemblies D2. The processing modules D3 can be correspondingly disposed in an enclosed space SP3 defined by the outer housing C2 and the connecting assemblies D2.

In one of the embodiments, the dynamic power device C further can include a brake C7 and a lead member C8, a part of the brake C7 is fixed on a side of the outer end cap C3, and the brake C7 and the connecting member 10 are connected to each other. The brake C7 is electrically connected to the processing modules D3, and the processing modules D3 can drive the brake C7 to stop the connecting member 10 to rotate.

The lead member C8 has a lead channel C81 penetrating through the lead member C8 along the central axis CP, the lead member C8 and the second frame 16 are fixed to each other, the lead member C8 and the connecting member 10 are not fixed to each other, a part of the lead member C8 is correspondingly disposed in the connecting channel 10C of the connecting member 10, and a part of the lead member C8 is correspondingly disposed in the hollow channel 161 of the second frame 16. The lead channel C81 is configured to enable at least one wire to be set therein, and the at least one wire is configured to connect the processing modules D3, the sensor, the driving unit C1, and the brake C7, etc.

It should be noted that in this embodiment, each of the dynamic power device C includes one of the processing modules D3 disposed therein, but the one of the processing modules D3 is not limited to being disposed in the dynamic power device C. In different embodiments, the transfer apparatus D can include only a single processing module D3 disposed in the base D1, and the single processing module D3 is electrically connected to the driving unit C1 of each of the dynamic power devices C by the wires.

As shown in FIG. 16 to FIG. 23, the present disclosure provides an electric bicycle E including a frameset E1, a handlebar E2, a front wheel E31, a rear wheel E32, a saddle E4, a brake system E5, a transmission member E6, a dynamic power supply system E7, an electric power system E8, and a processing module E9. The frameset E1 includes a bike frame, a bike front fork, a bike rear fork, a seat post, and the handlebar E2, the front wheel E31, the rear wheel E32, the saddle E4, the brake system E5, the transmission member E6, the dynamic power supply system E7, the electric power system E8, and the processing module E9 are disposed on the frameset E1.

More specifically, the dynamic power supply system E7 is disposed on a bottom bracket of the bike frame of the frameset E1, the transmission member E6 is configured to be connected to the dynamic power supply system E7 and the rear wheel E32, and the transmission member E6 can be, for example, a chain, but it is not limited thereto. In practice, the electric bicycle E can further include a derailleur system. The electric power system E8 can include, for example, rechargeable batteries, the processing module E9 is electrically connected to the dynamic power supply system E7 and the electric power system E8, and the processing module E9 can drive the dynamic power supply system E7 and the electric power system E8.

As shown in FIG. 17 to FIG. 22, the dynamic power supply system E7 includes a dynamic power device E71, a crank spindle E72, two cranks E73, a first one-way clutch E74, a chainring E75, and a second one-way clutch E76. The dynamic power device E71 includes an outer housing E711, a harmonic deceleration module E712, a driving unit E713, an outer end cap E714, a first auxiliary end cap E715, a first auxiliary bearing E716, a torque sensor E717, a second auxiliary end cap E718, and a second auxiliary bearing E719.

The connection and operation relationships among the outer housing E711, the harmonic deceleration module E712, the driving unit E713, and the outer end cap E714 of the present embodiment are substantially the same as the connection and operation relationships among the outer housing C2, the harmonic deceleration module A, the driving unit C1, and the outer end cap C3 of the preceding embodiments, and only the differences of the embodiments are described in the following description.

As shown in FIG. 18 to FIG. 21, the outer end cap E714 of the present embodiment further has an outer through hole E7141 penetrating through the outer end cap E714. The first auxiliary end cap E715 is a ring-shaped structure, and a periphery of the first auxiliary end cap E715 and an inner side of the outer through hole E7141 are fixed to each other. The first auxiliary bearing E716 has an inner ring E7161 and an outer ring E7162, an inner side of the first auxiliary end cap E715 and the outer ring E7162 of the first auxiliary bearing E716 are fixed to each other, and the inner ring E7161 of the first auxiliary bearing E716 and a periphery of the crank spindle E72 are fixed to each other. The crank spindle E72 can rotate relative to the first auxiliary end cap E715 by the first auxiliary bearing E716.

A part of the crank spindle E72 passes through the dynamic power device E71, and a part of the crank spindle E72 correspondingly passes through the connecting channel 10C of the connecting member 10. The two cranks E73 are connected to two ends of the crank spindle E72 by one of two ends of each of the cranks E73, respectively, another of two ends of each of the cranks E73 away from the crank spindle E72 is configured to be connected to a pedal E10. The user can rotate the crank spindle E72 and stop the crank spindle E72 to rotate by pedaling the two pedals E10.

One end of the torque sensor E717 and the outer end cap E714 can be fixed to each other, a part of the torque sensor E717 is disposed in the connecting channel 10C of the connecting member 10, a part of the torque sensor E717 is connected to the periphery of the crank spindle E72, and the torque sensor E717 is configured to sense the torque of the crank spindle E72 and correspondingly generate a torque sensing signal.

Figure 16:
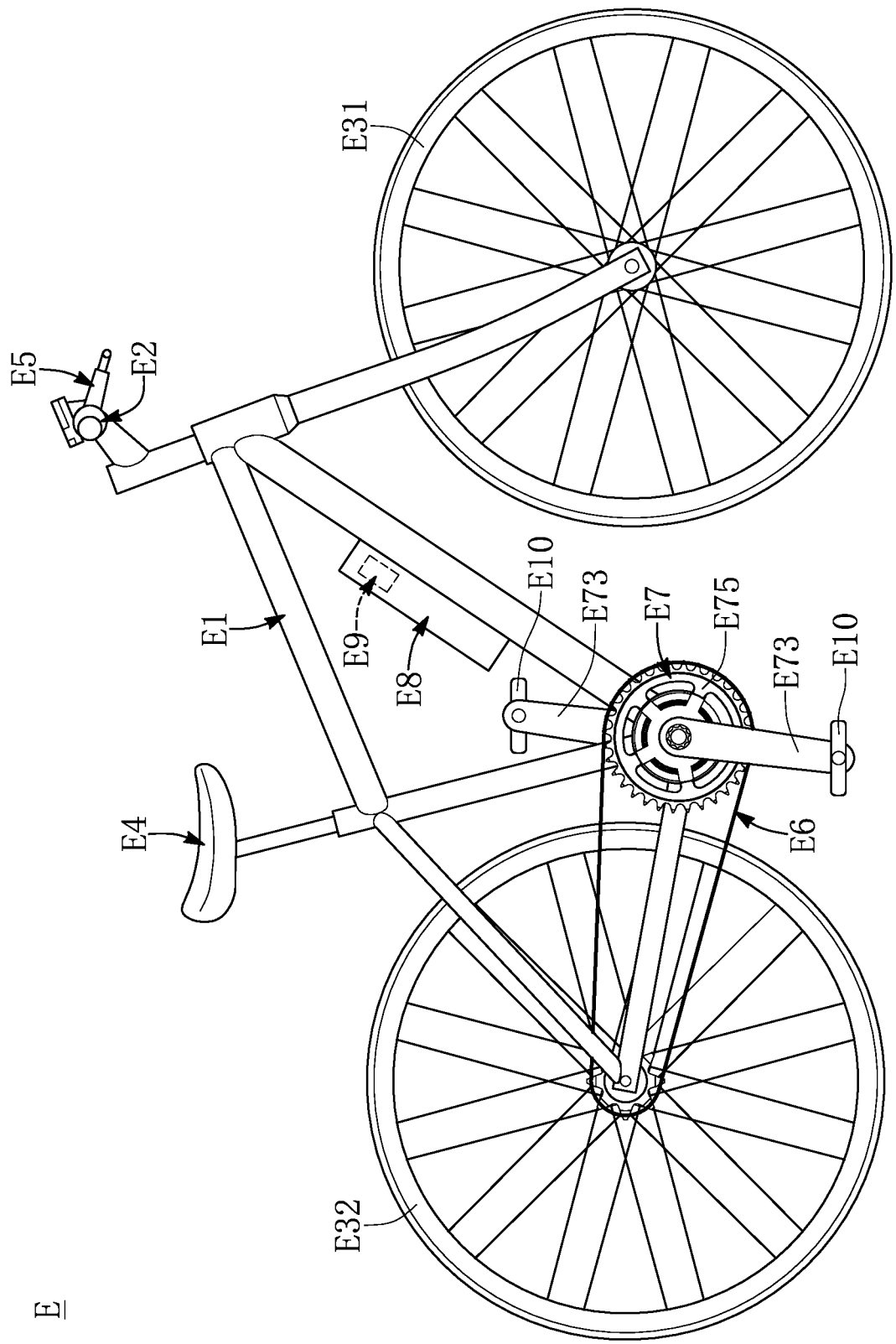
FIG. 16 is a schematic view of an electric bicycle according to the present disclosure.
Figure 17:
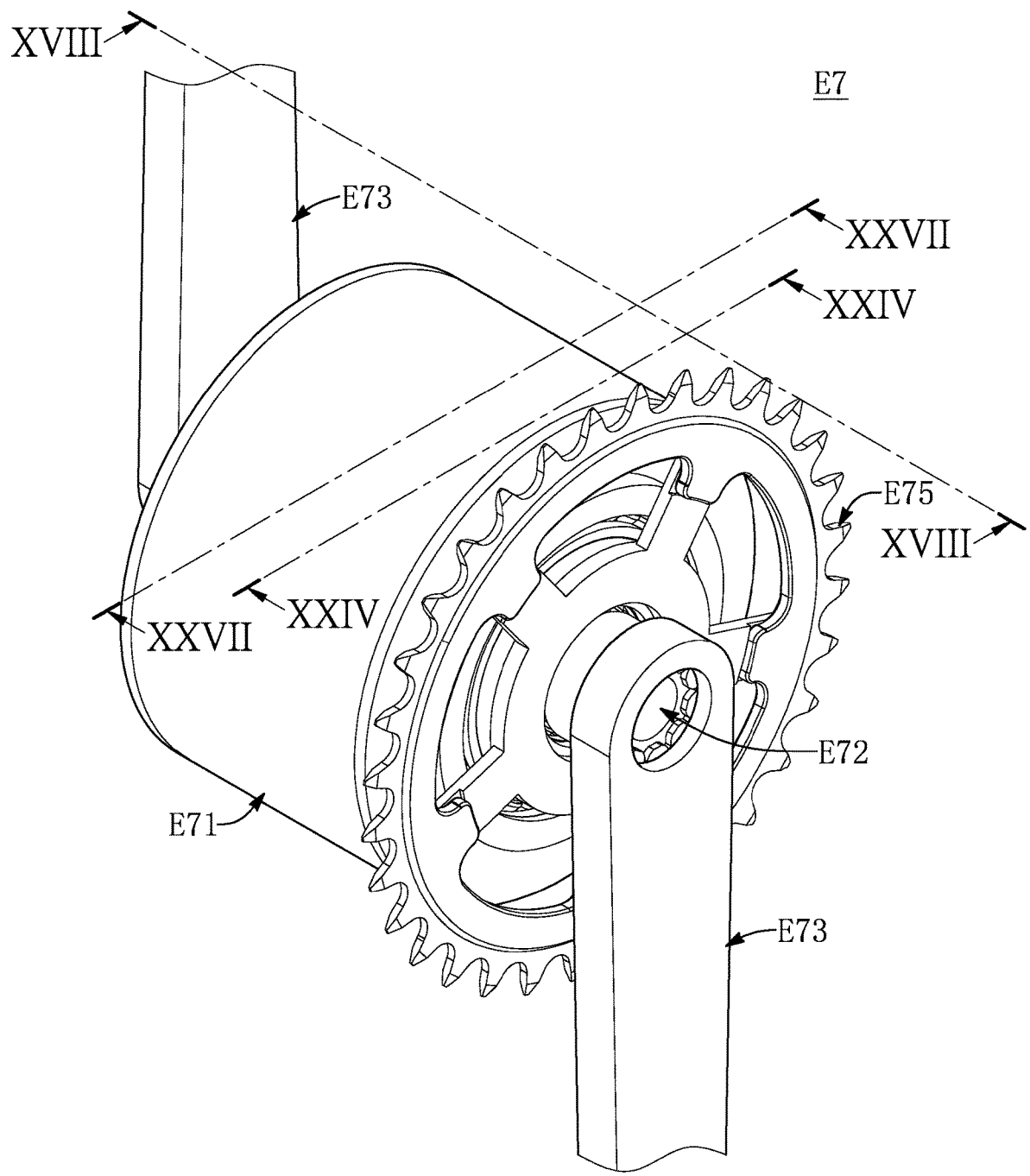
FIG. 17 is a schematic view of a dynamic power supply system of the electric bicycle according to the present disclosure.
Figure 18:
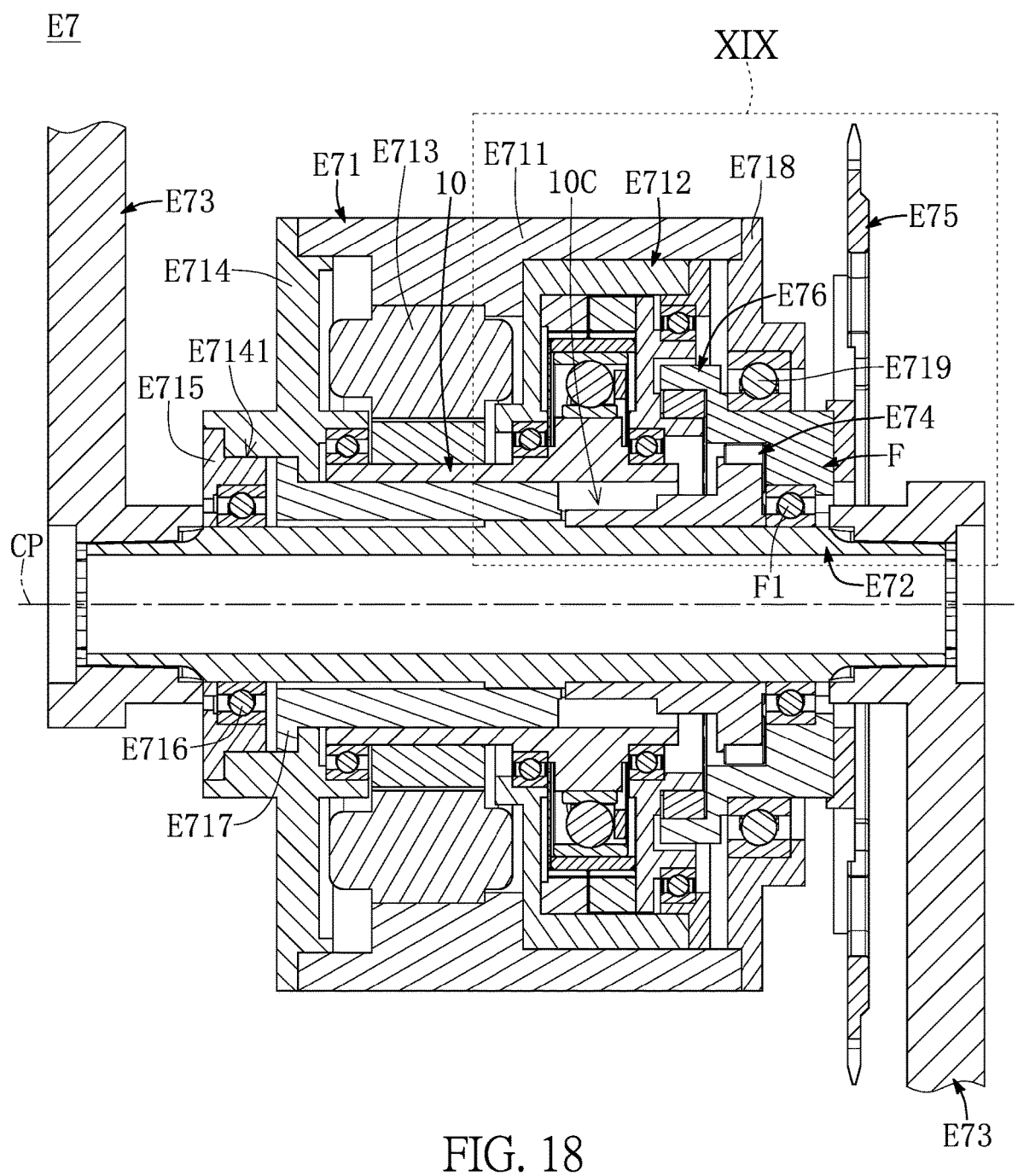
FIG. 18 is a cross-sectional view taken along line XVIII-XVIII of FIG. 18.

As shown in FIG. 16, the torque sensor E717 is electrically connected to the processing module E9, the processing module E9 is configured to receive the torque sensing signal transmitted by the torque sensor E717 and determines that whether or not the torque of the crank spindle E72 exceeds a predetermined torque value, according to the torque sensing signal. When the processing module E9 determines that the torque of the crank spindle E72 reaches the predetermined torque value, the processing module E9 can control the driving unit E713 of the dynamic power device E71 to drive the second frame 16 to rotate.

The second auxiliary end cap E718 is a ring-shaped structure and is fixed on one end of the outer housing E711 opposite to another end of the outer housing E711 provided with the outer end cap E714, and the end cap 20 of the harmonic deceleration module E712 is correspondingly located in the outer housing E711. The second auxiliary bearing E719 has an inner ring E7191 and an outer ring E7192, an inner side of the second auxiliary end cap E718 and the outer ring E7192 of the second auxiliary bearing E719 are fixed to each other, the inner ring E7191 of the second auxiliary bearing E719 and the first one-way clutch E74 are connected to each other, and the first one-way clutch E74 can rotate relative to the second auxiliary end cap E718 by the second auxiliary bearing E719. As shown in FIG. 16, the chainring E75 and the first one-way clutch E74 are fixed to each other, and the chainring E75 is configured to be connected to the transmission member E6. The first one-way clutch E74 and the crank spindle E72 are connected to each other, and the crank spindle E72 can be connected to the chainring E75 by the first one-way clutch E74.

As shown in FIG. 16, by the first one-way clutch E74, when the two pedals E10 are pedaled, the two cranks E73 are driven to rotate forward the front of the electric bicycle E (i.e., the user pedals forward), the crank spindle E72 is connected to the chainring E75 by the first one-way clutch E74, and the chainring E75 rotates with the crank spindle E72. Accordingly, the chainring E75 drives the rear wheel E32 to rotate forward by the transmission member E6.

Conversely, as shown in FIG. 16, when the two pedals E10 are pedaled to drive the two cranks E73 to rotate forward the rear of the electric bicycle E (i.e., the user pedals backward), the crank spindle E72 drives the first one-way clutch E74, the first one-way clutch E74 does not drive the crank spindle E72 to drive the chainring E75, and the chainring E75 does not rotate with the crank spindle E72.

The second one-way clutch E76 and the second frame 16 of the harmonic deceleration module E712 are connected to each other, and the second one-way clutch E76 and the first one-way clutch E74 are connected to each other. As shown in FIG. 16, when the two pedals E10 are pedaled to drive the two cranks E73 to rotate forward, the first one-way clutch E74 drives the second one-way clutch E76, but the second one-way clutch E76 does not drive the second frame 16 to rotate.

As shown in FIG. 16, when the two pedals E10 are pedaled to drive the two cranks E73 to rotate backward, the first one-way clutch E74 does not drive the crank spindle E72 to rotate synchronously with the chainring E75, and the crank spindle E72 is idle relative to the first one-way clutch E74. Accordingly, the first one-way clutch E74 does not drive the second one-way clutch E76.

When the user pedals forward and the crank spindle E72 drives the chainring E75 to rotate forward, if the processing module E9 (as shown in FIG. 16) controls the driving unit E713 at the same time, then the second one-way clutch E76 drives the chainring E75 to rotate at the same time. Accordingly, the effect of electrically assisted riding can be achieved.

In practice, when the user pedals forward, the torque sensor E717 connected to the crank spindle E72 continuously transmits the torque sensing signal to the processing module E9 (as shown in FIG. 16). When the processing module E9 determines that the torque of the crank spindle E72 exceeds a predetermined torque value according to the torque sensing signal, the processing module E9 controls the driving unit E713 to drive the second frame 16 to drive the chainring E75 to rotate by the second one-way clutch E76 and the first one-way clutch E74. Accordingly, the effect of electrically assisted riding can be achieved.

For example, when the user rides on a steep terrain, the torque of the crank spindle E72 is relatively large. At this time, the processing module E9 (as shown in FIG. 16) can control the driving unit E713 to drive the chainring E75 to rotate. Accordingly, the burden of paddling on the user is reduced.

Referring to FIG. 22 to FIG. 26, in practice, the first one-way clutch E74 can include a first annular member E741, a first annular wall E742, and a plurality of first rollers E743, and the first annular member E741 has a center through hole E7411 penetrating through the first annular member E741. The first annular member E741 has a plurality of first protruding structures E7412 and a plurality of first recesses E7413 formed on a periphery thereof, the first protruding structures E7412 are spaced apart from each other, and each of the first recesses E7413 is located between the two of the first protruding structures E7412 adjacent to each other. One of the first protruding structures E7412 is located between the two first recesses E7413 adjacent to each other, and each of the first recesses E7413 has two first arc surfaces E7414 and E7415 having different arcs.

The first annular wall E742 can be formed in an auxiliary frame F that is pivotally connected to the periphery of the crank spindle E72 by a third auxiliary bearing F 1, and an inner side wall of the first annular member E741 forming the center through hole E7411 and the periphery of the crank spindle E72 are fixed to each other. The first annular wall E742 is disposed to face the first recesses E7413, each of the first rollers E743 is disposed in one of the first recesses E7413, each of the first rollers E743 is located between the first annular member E741 and the first annular wall E742, and an end of the auxiliary frame F is connected to the chainring E75.

Figure 23:
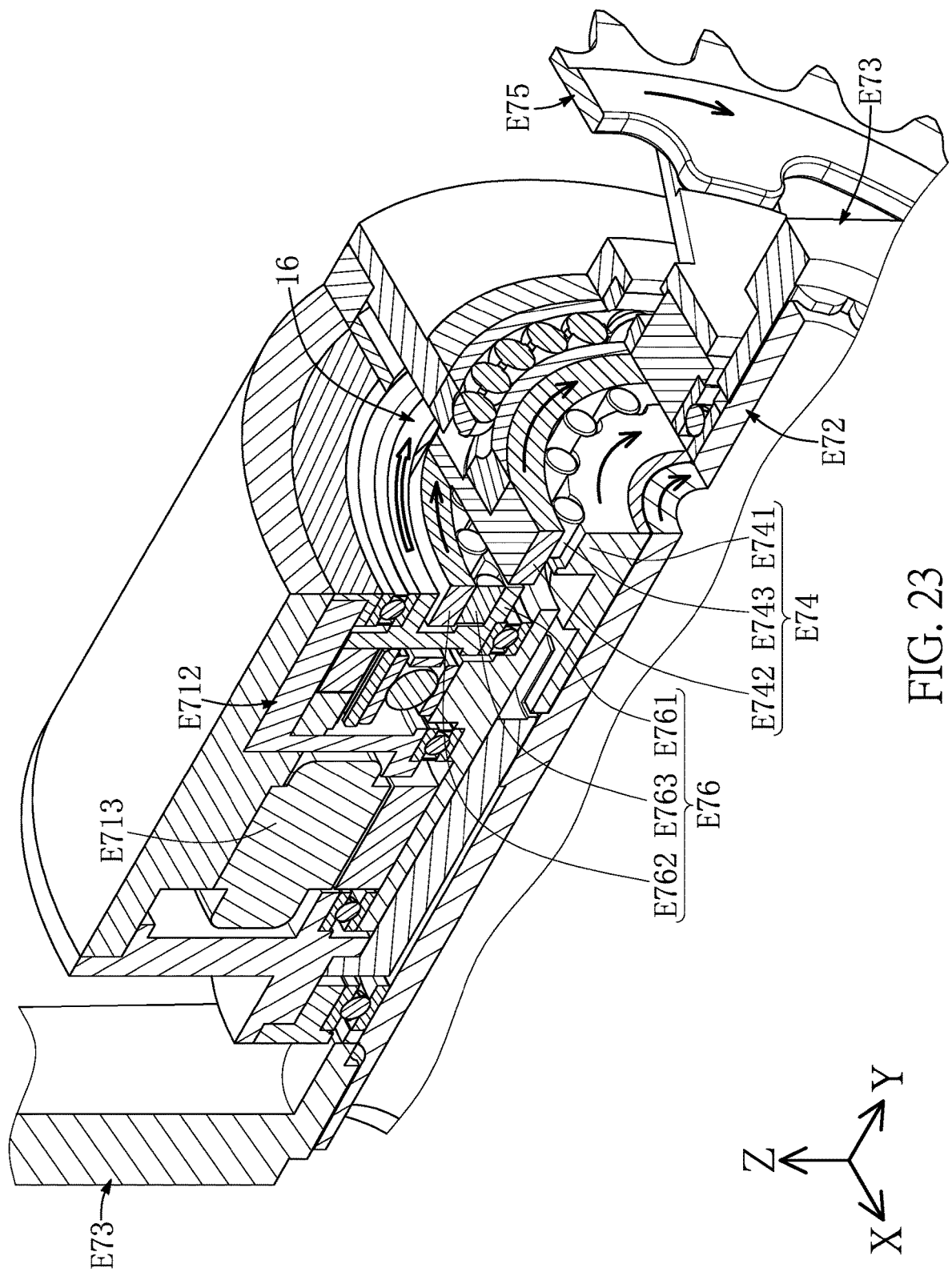
FIG. 23 is a partial cross-sectional view of the dynamic power supply system of the electric bicycle according to the present disclosure.
Figure 24:
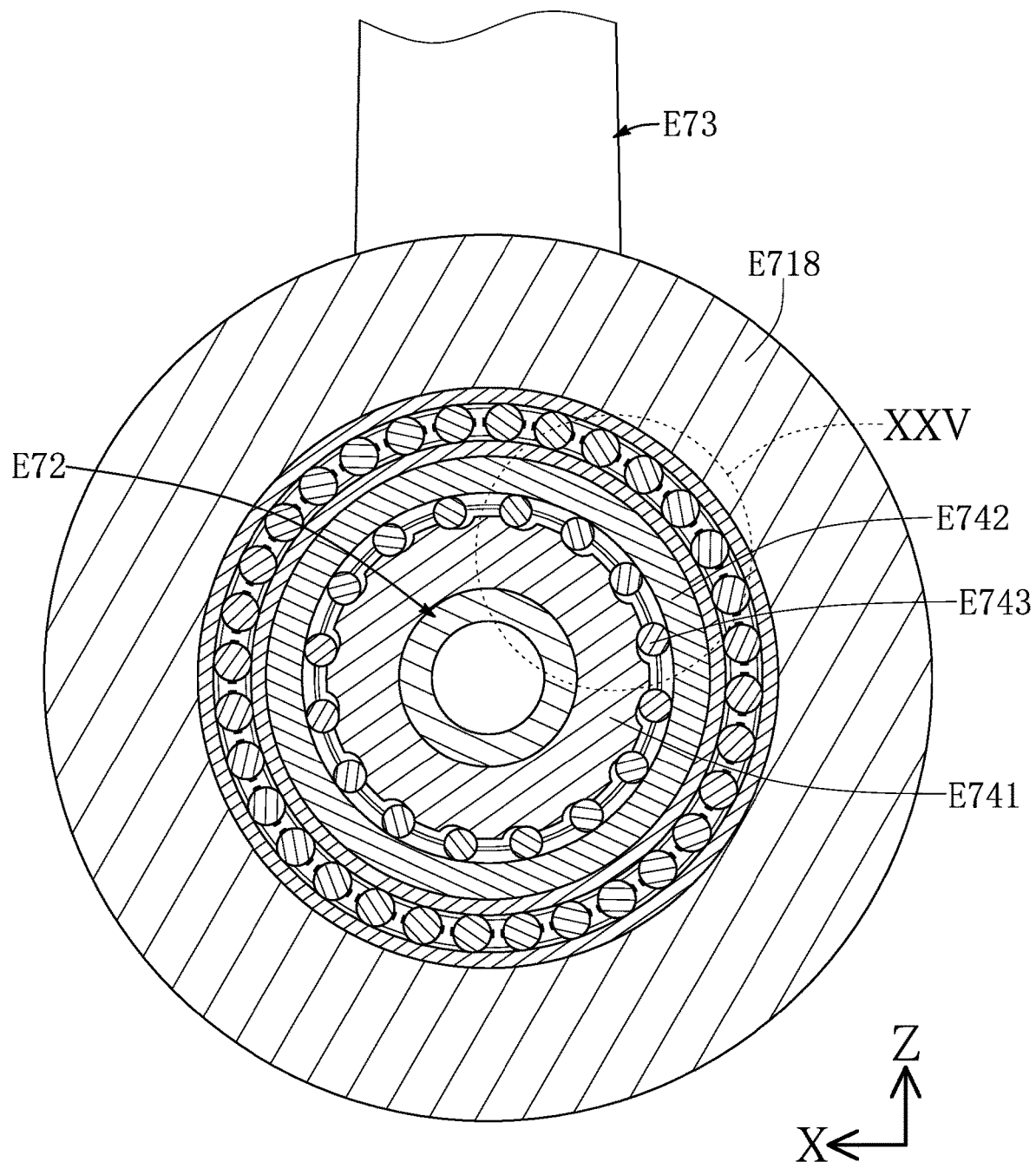
FIG. 24 is a cross-sectional view taken along line XXIV-XXIV of FIG. 17.
Figure 25:
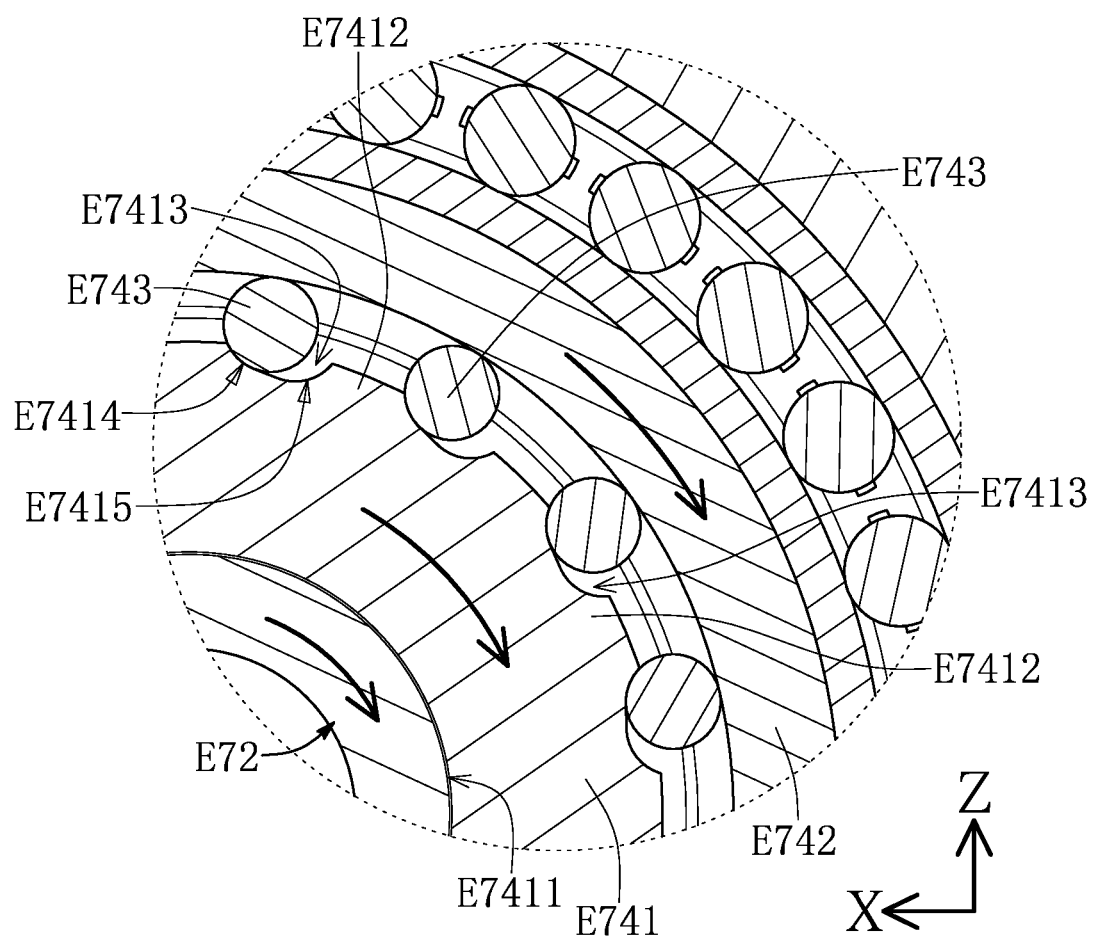
FIG. 25 is an enlarged view of part XXV of FIG. 24.

As shown in FIG. 16, FIG. 23, and FIG. 25, when the user pedals forward and rotates the crank spindle E72 clockwise (i.e., a first direction), the crank spindle E72 drives the first annular member E741 to rotate clockwise, and each of the first rollers E743 is correspondingly located between one of the first arc surfaces E7414 of the first recesses E7413 and the first annular wall E742. At this time, each of the first rollers E743 is fixedly held by the first annular member E741 and the first annular wall E742, the first annular wall E742 rotates clockwise with the first annular member E741, such that the chainring E75 connected to the auxiliary frame F is driven to rotate with the auxiliary frame F, and the chainring E75 drives the rear wheel E32 to rotate in a forward direction of the electric bicycle by the transmission member E6.

Figure 26:
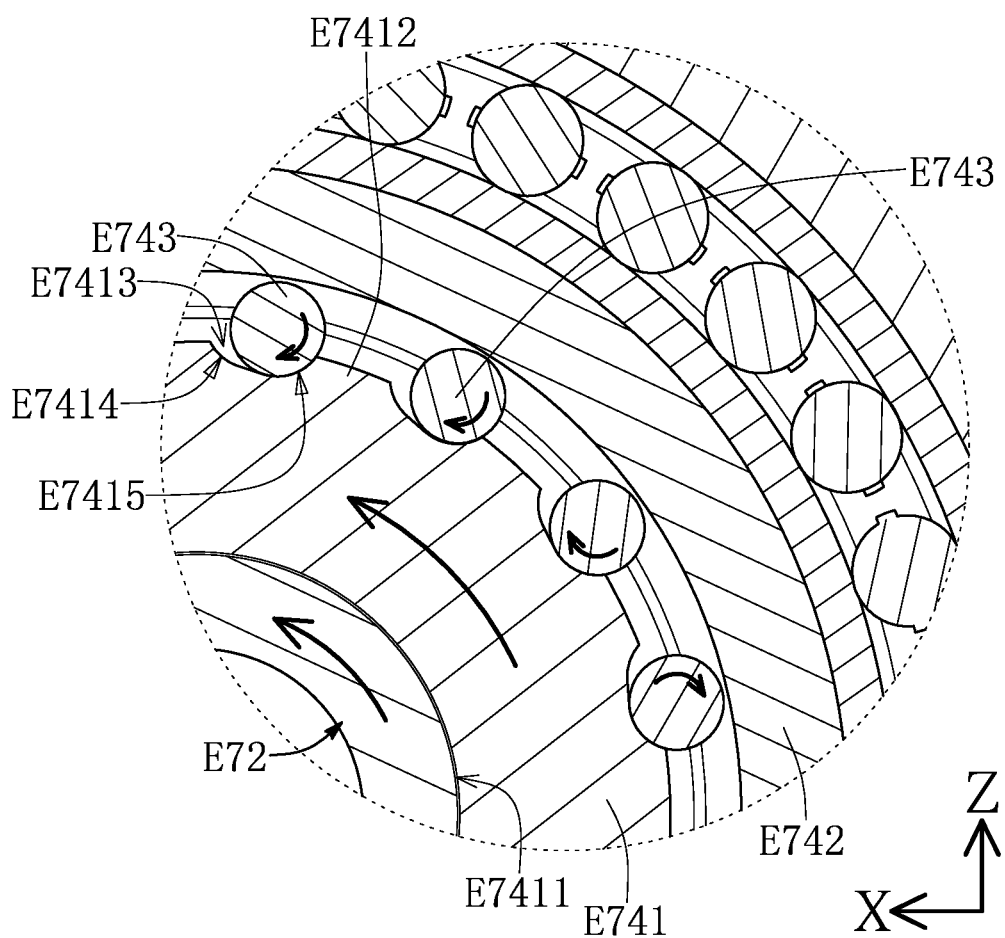
FIG. 26 is a partial enlarged view of another state of a crank spindle, a first annular member, a first annular wall, and a plurality of first rollers of the dynamic power supply system of the electric bicycle according to the present disclosure.
Figure 27:
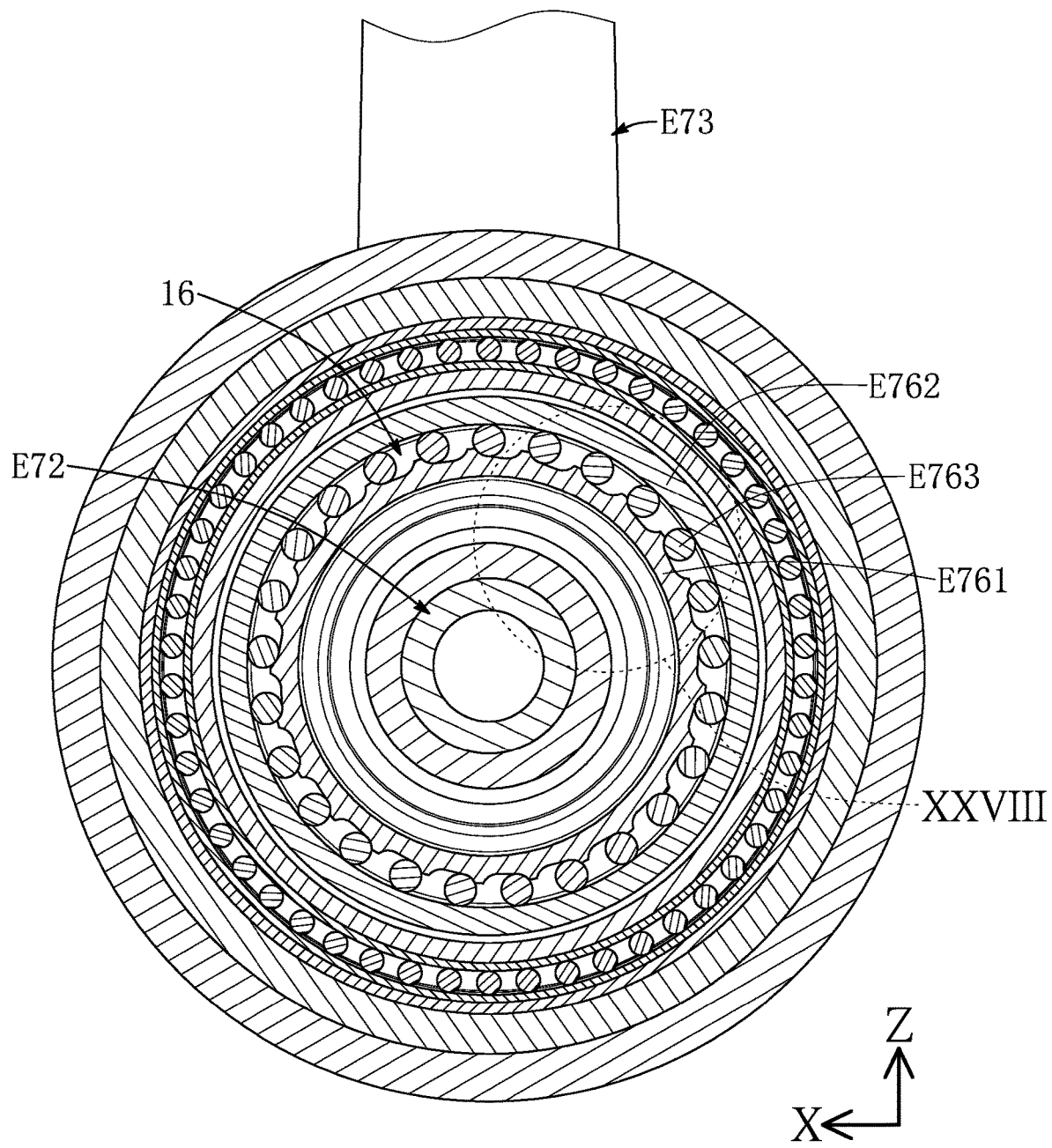
FIG. 27 is a cross-sectional view taken along line XXVII-XXVII of FIG. 17.
Figure 28:
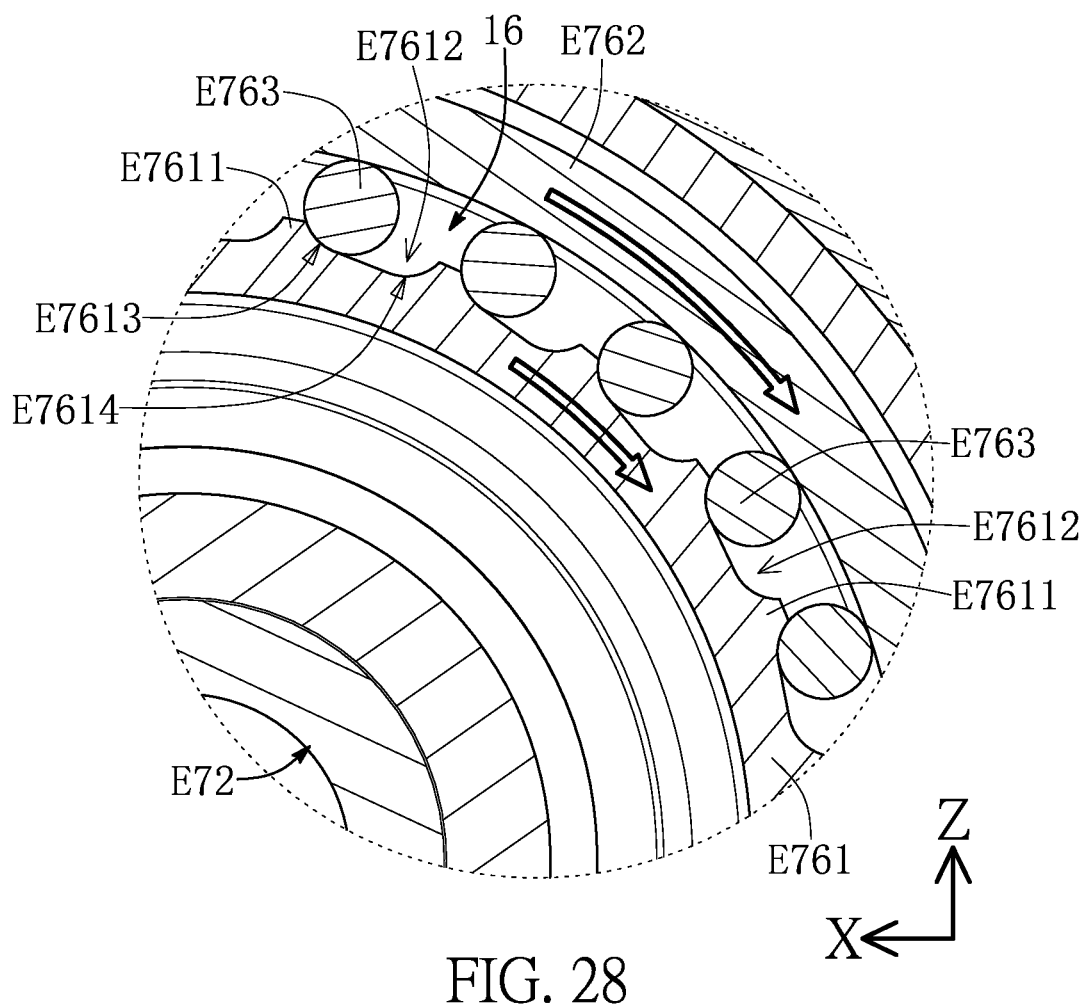
FIG. 28 is an enlarged view of part XXVIII of FIG. 28.

As shown in FIG. 16, FIG. 23, and FIG. 26, when the user pedals backward to rotate the crank spindle E72 counterclockwise (i.e., a second direction), the crank spindle E72 drives the first annular member E741 to rotate counterclockwise, and each of the first rollers E743 is correspondingly located between one of the first arc surfaces E7415 of the first recesses E7413 and the first annular wall E742. At this time, each of the first protruding structures E7412 dials the first rollers E743 adjacent thereto, and each of the first rollers E73 are not fixedly held by the first annular member E741 and the first annular wall E742. Accordingly, the first annular wall E742 does not rotate with the first annular member E741, that is, the auxiliary frame F and the chainring E75 connected to the auxiliary frame F do not rotate with the crank spindle E72. In other words, when the user pedals backward, the crank spindle E72 drives the first annular member E741 to rotate, while each of the first rollers E743 is in the state of self-rotation, and the first annular wall E742 and the chainring E75 connected to the first annular wall E742 do not rotate accordingly.

As shown in FIG. 18, FIG. 22, FIG. 23, FIG. 27, and FIG. 28, the second one-way clutch E76 includes a second annular member E761, a second annular wall E762, and a plurality of second rollers E763. The second annular member E761 has a plurality of second protruding structures E7611 and a plurality of second recesses E7612 forming on a periphery thereof, the second protruding structures E7611 are spaced apart from each other, each of the second recesses E7612 is located between the two of the second protruding structures E7611 adjacent to each other, and each of the second protruding structures E7611 is located between the two second recesses E7612 adjacent to each other. Each of the second recesses E7612 has two second arc surfaces E7613, E7614 having different arcs.

Figure 19:
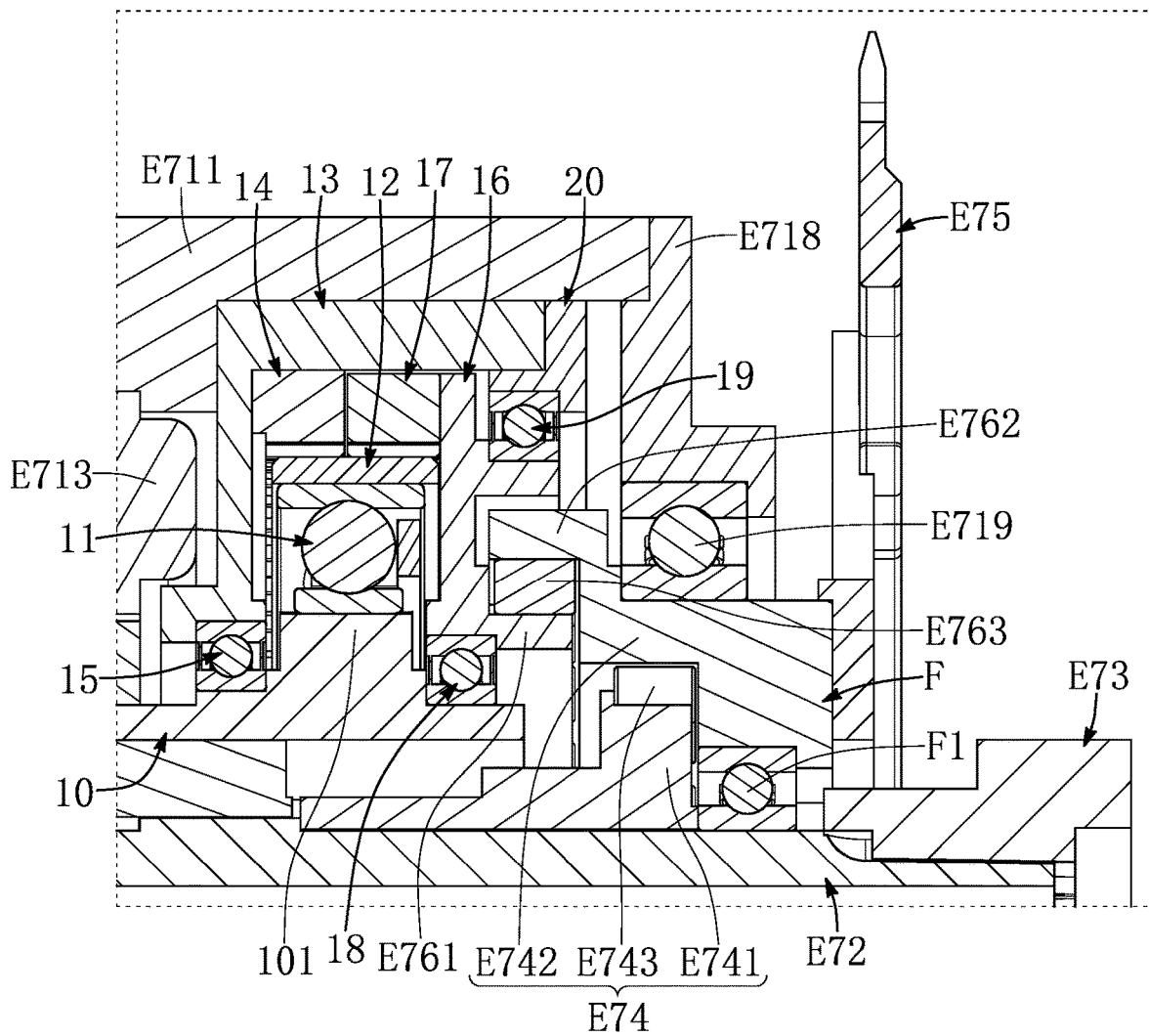
FIG. 19 is an enlarged view of part XIX of FIG. 19.
Figure 20:
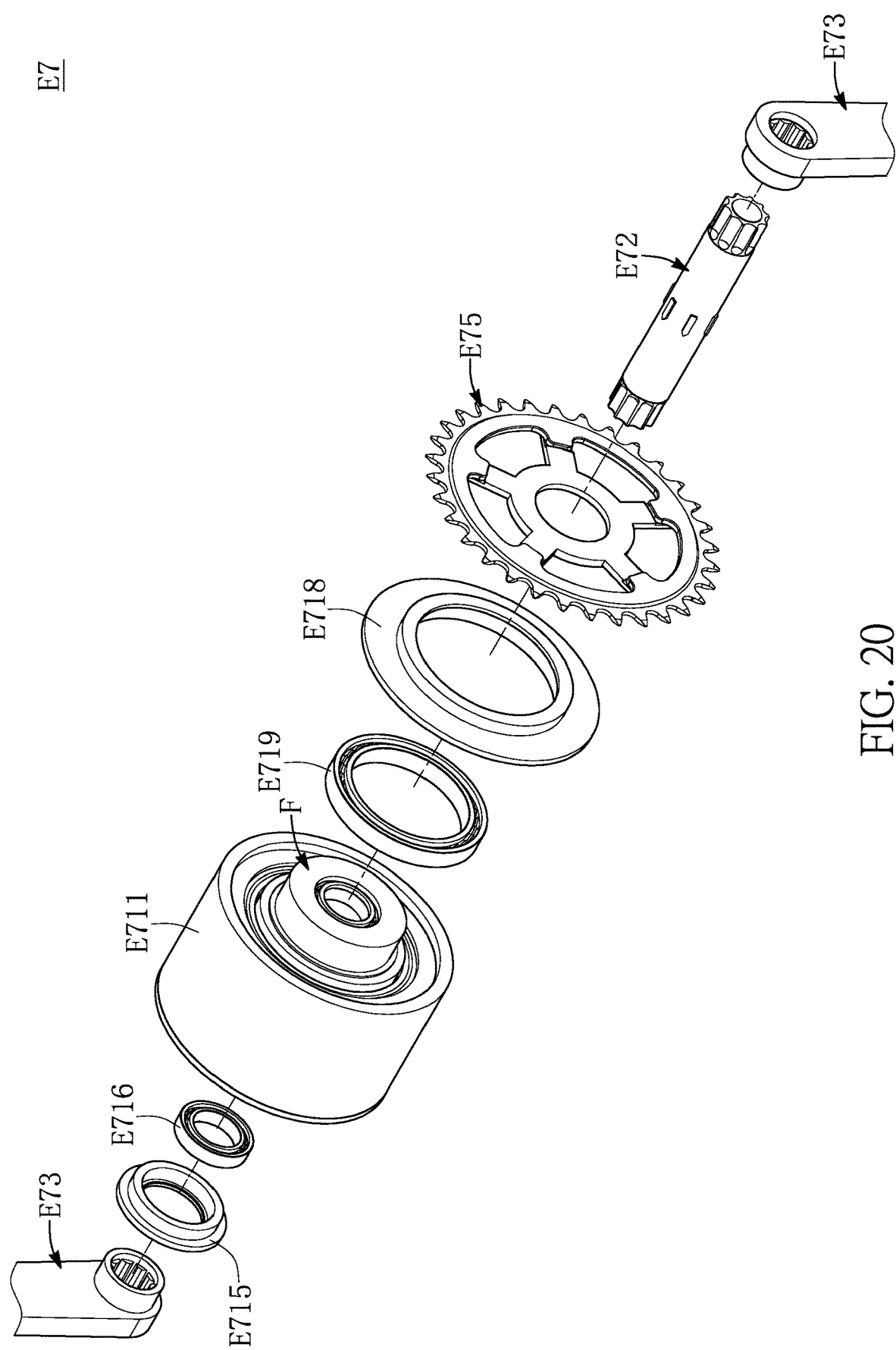
FIG. 20 to FIG. 22 are partial exploded views of different members of the dynamic power supply system of the electric bicycle according to the present disclosure.
Figure 21:
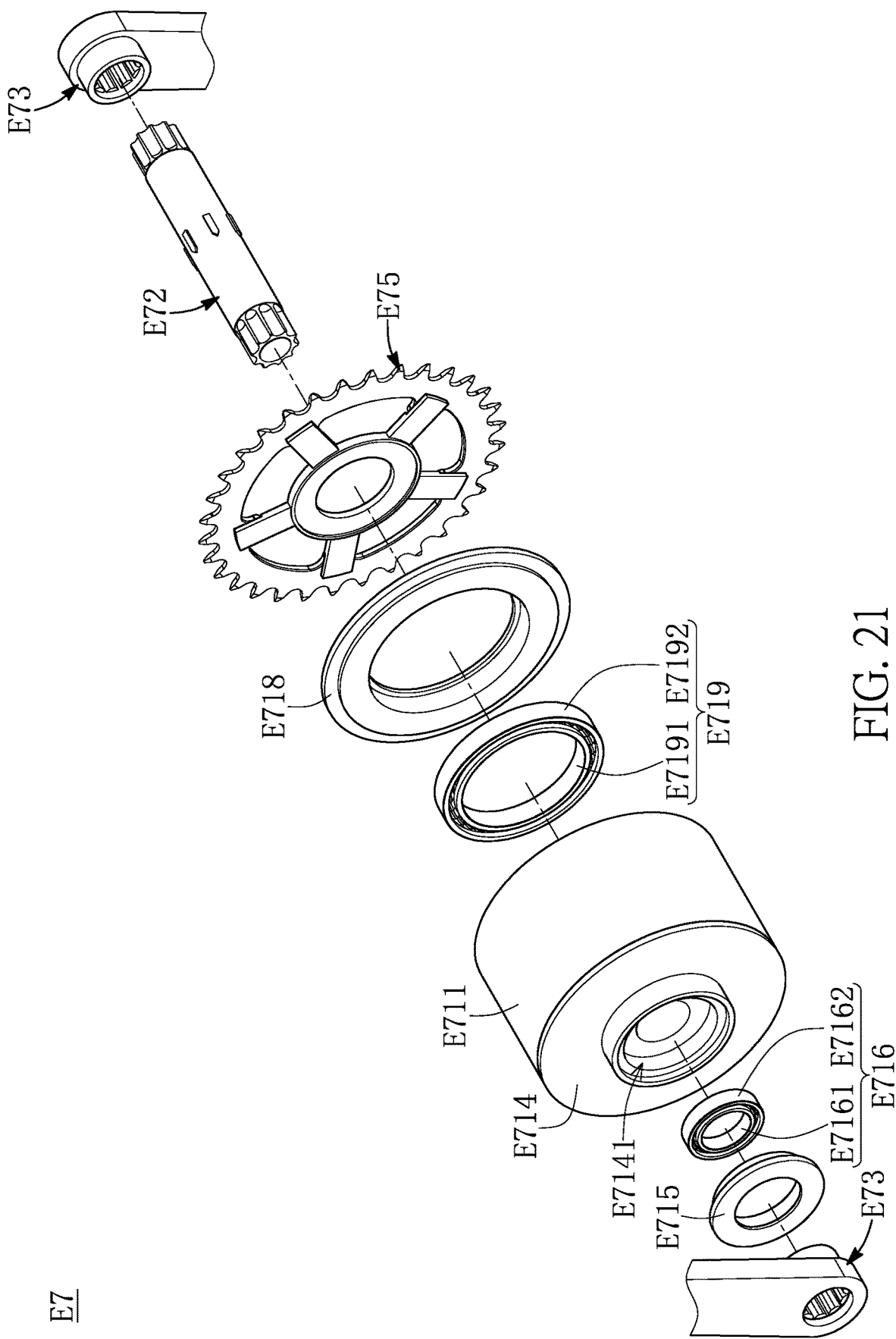
Figure 22:
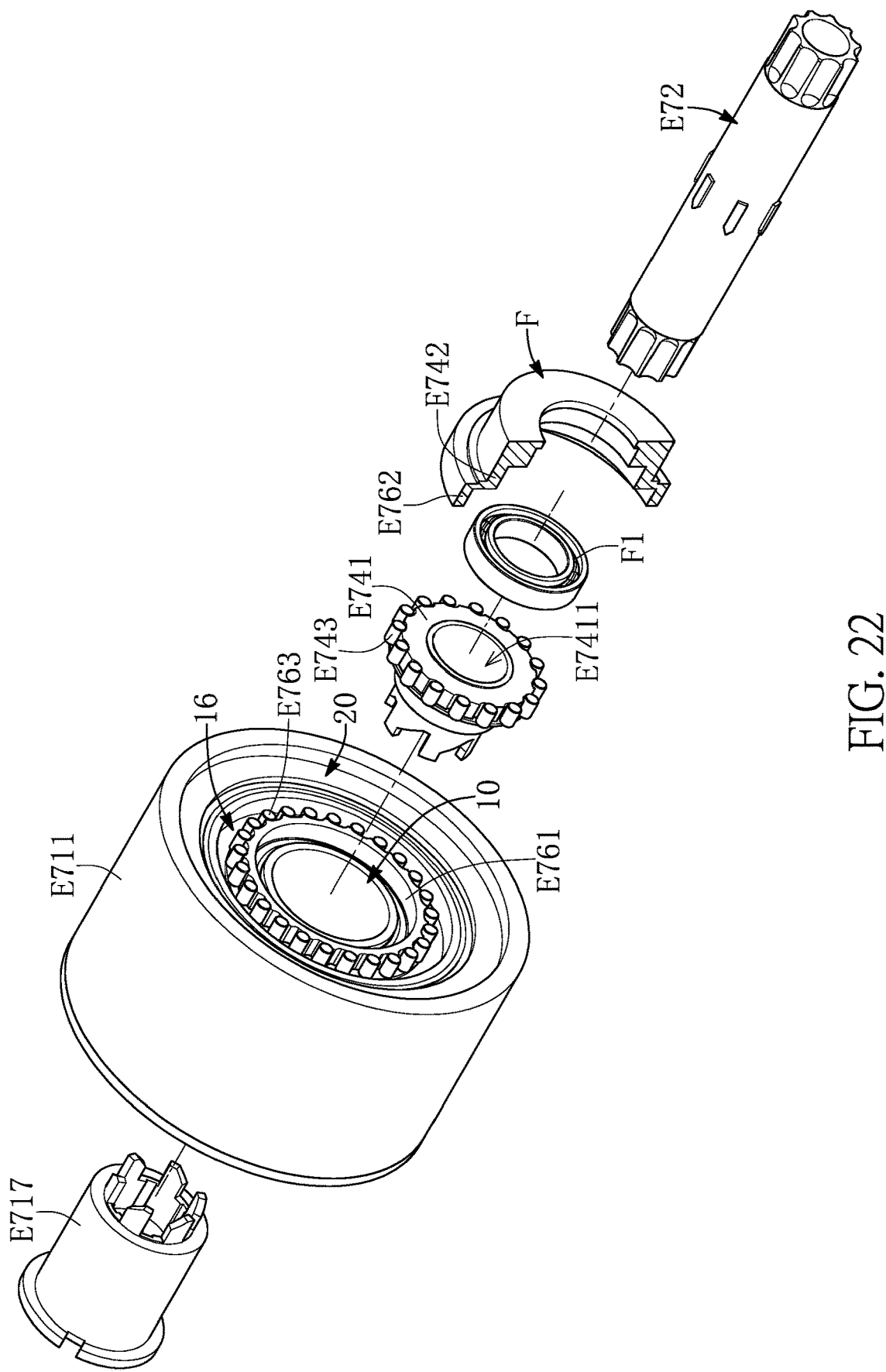

As shown in FIG. 19, the second annular member E761 and the second frame 16 can be integrally formed, and the second annular member E761 is located on a side of the second frame 16 opposite to the flexspline 12. The second annular wall E762 can be formed in the auxiliary frame F and face the second recesses E7612, each of the second rollers E763 is disposed in one of the second recesses E7612, and each of the second rollers E763 is located between the second annular member E761 and the second annular wall E762.

As shown in FIG. 16, FIG. 23, FIG. 27 and FIG. 28, when the driving unit E713 drives the second frame 16 to rotate clockwise, the second annular member E761 rotates clockwise with the second frame 16, each of the second rollers E763 is correspondingly located between one of the second arc surfaces E7613 of the second recesses E7612 and the second annular wall E762. At this time, each of the second rollers E763 is fixedly held by the second annular wall E762 and the second annular member E761, the second annular wall E762 rotates clockwise with the second annular member E761, and the chainring E75 connected to the auxiliary frame F rotates with the auxiliary frame F such that the chainring E75 drives the rear wheel E32 in the forward direction of the electric bicycle by the transmission member E6.

As shown in FIG. 23, when the crank spindle E72 rotates clockwise such that the electric bicycle moves forward, the crank spindle E72 drives the first annular member E741 to rotate clockwise, and the first ring-side wall 132 of the auxiliary frame F is driven to rotate clockwise by the first rollers. The second annular wall E762 of the auxiliary frame F rotates relative to the second rollers E763, each of the second rollers E763 are driven to be in the state of self-rotation, and the second annular wall E762 of the auxiliary frame F does not hold the second rollers E763 together with the second annular member E761. That is, when the crank spindle E72 rotates clockwise and the driving unit E713 is not in operation, the crank spindle E72 does not drive the second frame 16 to rotate by the first one-way clutch E74 and the second one-way clutch E76.

It is worth mentioning that, by virtue of technical means such as "the first annular wall E742 of the first one-way clutch E74 and the second annular wall E762 of the second one-way clutch E76 being integrally formed and disposed in the auxiliary frame F" and "the second annular member E761 of the second one-way clutch E76 and the second frame 16 being integrally formed", etc., the overall volume of the dynamic power supply system E7 can be greatly reduced. Naturally, in different embodiments, the first annular wall E742 and the second annular wall E762 can be connected to each other by means of non-integral forming, and the second annular member E761 and the second frame 16 can be connected to each other by means of non-integral forming.

Beneficial Effects of the Embodiments

It should be noted that the dynamic power supply system of the electric bicycle of the present disclosure has the advantages of easy assembly and low assembly time compared with the conventional power supply system of the conventional electric bicycle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dynamic power device, comprising:
   a harmonic deceleration module, including:
   a connecting member having two opposite ends and a cam part, wherein the two opposite ends are respectively defined as a first end and a second end, and the connecting member is configured to be driven to rotate around a central axis;

a flexible bearing having an inner ring and an outer ring, wherein the inner ring is fixed at a periphery of the cam part, and when the connecting member is driven to rotate, the cam part and the flexible bearing jointly form a wave generator;

a flexspline connected to the outer ring of the flexible bearing by an inner side thereof, wherein the flexspline has a plurality of outer gear-shaped structures formed on a periphery of the flexspline;

a first frame, part of which is pivotally connected to a periphery of the connecting member;

a first circular spline being a ring-shaped structure and having a plurality of first inner gear-shaped structures, wherein the first circular spline and the first frame are fixed to each other, and the first inner gear-shaped structures and the outer gear-shaped structures are meshed with each other;

a second frame, part of which is pivotally connected to the periphery of the connecting member, wherein the second frame is configured to be connected to an outer output member, and when the second frame is driven to rotate, the second frame rotates around the central axis;

a second circular spline being a ring-shaped structure and having a plurality of second inner gear-shaped structures, wherein the second circular spline and the second frame are fixed to each other, and the second inner gear-shaped structures and the outer gear-shaped structures are meshed with each other; and an end cap fixedly disposed on an end of the first frame, wherein the end cap and a periphery of the second frame are pivotally connected to each other;

wherein a quantity of the first inner gear-shaped structures of the first circular spline is equal to a quantity of the outer gear-shaped structures of the flexspline, and a quantity of the second inner gear-shaped structures of the second circular spline is greater than the quantity of the outer gear-shaped structures of the flexspline;

a driving unit connected to the connecting member;

an outer housing being a hollow structure, wherein the harmonic deceleration module and the driving unit are disposed in the outer housing; and an outer end cap fixedly disposed on an end of the outer housing;

wherein, when the driving unit is controlled to drive the connecting member to rotate around the central axis, the wave generator drives the flexspline to continually and flexibly deform, the flexspline drives the second circular spline to rotate, and the second frame rotates around the central axis along with the second circular spline, and wherein a dynamic power input by the connecting member is decelerated and output by the second frame;

wherein the dynamic power device further includes at least four bearings respectively defined as a first bearing, a second bearing, a third bearing, and an auxiliary bearing, wherein the first bearing has an inner ring and an outer ring, the inner ring of the first bearing and the periphery of the connecting member are fixed to each other, and the outer ring of the first bearing and the first frame are fixed to each other, wherein the second bearing has an inner ring and an outer ring, the inner ring of the second bearing and the periphery of the connecting member are fixed to each other, and the outer ring of the second bearing and the second frame are fixed to each other, wherein the third bearing has an inner ring and an outer ring, the inner ring of the third bearing and the periphery of the second frame are fixed to each other, and the outer ring of the third bearing, an inner side of the first frame, and an inner side of the end cap are fixed to each other, wherein the connecting member, the first bearing, the second bearing, the third bearing, the first frame, the second frame, and the end cap define an enclosed space, and the flexspline, the first circular spline, the second circular spline, and the flexible bearing are correspondingly located in the enclosed space, wherein the auxiliary bearing has an inner ring and an outer ring, the inner ring of the auxiliary bearing and the periphery of the connecting member are fixed to each other, and the outer ring of the auxiliary bearing and the outer end cap are fixed to each other, and wherein the driving unit is located in another enclosed space defined by the connecting member, the first frame, the outer housing, the auxiliary bearing, and the outer end cap.

2. The dynamic power device according to claim 1, wherein the connecting member has a connecting channel penetrating through the connecting member along the central axis, the second frame has a hollow channel penetrating through the second frame along the central axis, and the connecting channel and the hollow channel are communicated with each other, wherein the dynamic power device further comprises a lead member having a lead channel, and the lead channel penetrates through the lead member along the central axis, and wherein the lead member and the second frame are fixed to each other, the lead member and the connecting member are not fixed to each other, and the lead channel is configured to enable at least one wire to be set therein.

3. The dynamic power device according to claim 1, wherein the second frame and the second circular spline are integrally formed, the first frame and the first circular spline are integrally formed, and a difference between the quantity of the first inner gear-shaped structures of the first circular spline and the quantity of the second inner gear-shaped structures of the second circular spline is less than five.

4. The dynamic power device according to claim 1, wherein the driving unit is a motor including a stator assembly and a rotor assembly, wherein the stator assembly is fixed on an inner side of the outer housing, and the rotor assembly and the periphery of the connecting member are fixed to each other, and wherein, when the driving unit is driven, the rotor assembly rotates relative to the stator assembly around the central axis.

5. The dynamic power device according to claim 1, further comprising at least one sensor configured to sense at least one of a torque, a speed, and a position of the connecting member when the connecting member rotates.

6. The dynamic power device according to claim 5, wherein one of the at least one sensor is a rotary encoder including a scanning unit and a magnetic ring, the scanning unit is fixedly disposed on the outer end cap, and the magnetic ring is fixedly disposed on the periphery of the connecting member.

7. An automatic mobile vehicle, comprising the dynamic power device as claimed in claim 1, at least one wheel, and a processing module, wherein one of the at least one wheel is connected to the second frame, and the processing module is electrically connected to the driving unit, and wherein the processing module is configured to control the driving unit to drive the one of the at least one wheel connected to the second frame to rotate by the harmonic deceleration module.

8. A transfer apparatus, comprising at least one of the dynamic power device as claimed in claim 1, at least one connecting assembly, and at least one processing module, wherein the second frame of the at least one of the dynamic power device and the at least one connecting assembly are connected to each other, the at least one processing module is electrically connected to the driving unit of the at least one of the dynamic power device, and the at least one of the processing module is configured to control the driving unit to drive the at least one of the connecting assembly that is connected to the second frame by the harmonic deceleration module.

9. A dynamic power supply system configured to be mounted on a frameset of an electric bicycle and comprising the dynamic power device as claimed in claim 1, the dynamic power supply system further comprising:
 a crank spindle;
 two cranks connected to two ends of the crank spindle by one of two ends of each of the cranks, respectively, wherein another of two ends of each of the cranks is configured to be connected to a pedal;
 a chainring;
 a first one-way clutch correspondingly connected to the crank spindle and the chainring; and
 a second one-way clutch correspondingly connected to the second frame and the first one-way clutch;
 wherein the dynamic power device further includes:
  a first auxiliary end cap being a ring-shaped structure, wherein a periphery of the first auxiliary end cap and an inner side of an outer through hole of an outer end cap are fixed to each other, and an inner side of the first auxiliary end cap and a periphery of the crank spindle are pivotally connected to each other; and
  a second auxiliary end cap fixed on an end of the outer housing, wherein the second auxiliary end cap and the first one-way clutch are pivotally connected to each other;
 wherein, when the two pedals are pedaled to drive the electric bicycle to move forward, the two cranks drive the crank spindle to rotate in a first direction, the crank spindle drives the first one-way clutch to rotate synchronously with the chainring in the first direction, and the chainring is configured to drive a rear wheel of the electric bicycle by a transmission member;
 wherein, when the two cranks are driven to rotate in a second direction, the crank spindle rotates synchronously with the first one-way clutch in the second direction, and the first one-way clutch does not rotate synchronously with the chainring, and wherein the second direction is opposite to the first direction; and
 wherein, when the driving unit is controlled to drive the connecting member to rotate in the first direction, the flexspline is driven to continually and flexibly deform and drives the second circular spline to rotate, the second frame rotates with the second circular spline in the first direction so as to drive synchronous movement of the second one-way clutch and the first one-way clutch, such that the chainring is driven to rotate in the first direction.

10. The dynamic power supply system according to claim 9, further comprising a processing module and a torque sensor, wherein the processing module is electrically connected to the torque sensor and the driving unit, and the torque sensor is configured to sense the torque of the crank spindle and correspondingly generate a torque sensing signal, and wherein, when the crank spindle is driven to rotate in the first direction and the processing module determines that the torque of the crank spindle exceeds a predetermined torque value according to the torque sensing signal, the processing module controls the driving unit to drive the second frame to drive the second one-way clutch, such that the chainring is driven to rotate in the first direction by the first one-way clutch.

11. The dynamic power supply system according to claim 9, wherein the first one-way clutch includes a first annular member, a first annular wall, and a plurality of first rollers, wherein the first annular member is fixed on the periphery of the crank spindle and includes a plurality of first protruding structures and a plurality of first recesses formed on a periphery thereof, the first protruding structures and the first recesses are spaced apart from each other, and each of the first recesses is located between two of the first protruding structures adjacent to each other, wherein the first annular wall is formed in an auxiliary frame pivotally connected to the periphery of the crank spindle, the second one-way clutch and the auxiliary frame are connected to each other, and an end of the auxiliary frame is connected to the chainring, wherein each of the first recesses has two first arc surfaces having different arcs, and when the crank spindle is driven to rotate in the first direction, each of the first rollers is located between one of the first arc surface and the first annular wall, each of the first rollers is fixedly held by the first annular member and the first annular wall, and the first annular wall rotates in the first direction with the crank spindle, such that the chainring is driven to rotate in the first direction, and wherein, when the crank spindle is driven to rotate in the second direction, each of the first rollers is driven to rotate between another one of the first arc surfaces and the first annular wall such that the first annular wall is not linked by the crank spindle.

12. The dynamic power supply system according to claim 11, wherein the second one-way clutch includes a second annular member, a second annular wall, and a plurality of second rollers, wherein the second annular member is formed on a side of the second frame and has a plurality of second protruding structures and a plurality of second recesses formed on a periphery thereof, the second protruding structures and the second recesses are spaced apart from each other, and each of the second recesses is located between two of the second protruding structures adjacent to each other, wherein the second annular wall is formed in the auxiliary frame, and each of the second recesses has two second arc surfaces having different arcs, and wherein, when the driving unit is driven to drive the second frame to rotate in the first direction, each of the second rollers is located between one of the two second arc surfaces and the second annular wall, each of the second rollers is fixedly held by the second annular member and the second annular wall, and the second annular wall rotates in the first direction with the second frame such that the chainring synchronously rotates in the first direction.

13. An electric bicycle comprising the dynamic power supply system and the frameset as claimed in claim 9, a processing module, and an electric power system, wherein the frameset includes a bike frame, a handlebar, a front wheel, the rear wheel, a saddle, a brake system, and the transmission member, and wherein the dynamic power supply system is disposed on the frameset, the processing module is electrically connected to the driving unit, and the electric power system is electrically connected to the processing module and is configured to provide electrical power to the dynamic power supply system.

14. The electric bicycle according to claim 13, wherein the dynamic power supply system further includes a processing module and a torque sensor, the processing module is electrically connected to the torque sensor and the driving unit, and the torque sensor is configured to sense the torque of the crank spindle and correspondingly generate a torque sensing signal, and wherein, when the crank spindle is driven to rotate in the first direction and the processing module determines that the torque of the crank spindle exceeds a predetermined torque value according to the torque sensing signal, the processing module controls the driving unit to drive the second frame to drive the second one-way clutch, such that the chainring is driven to rotate in the first direction by the first one-way clutch.

15. The electric bicycle according to claim 13, wherein the first one-way clutch includes a first annular member, a first annular wall, and a plurality of first rollers, the first annular member is fixed on the periphery of the crank spindle and includes a plurality of first protruding structures and a plurality of first recesses formed on a periphery thereof, the first protruding structures and the first recesses are spaced apart from each other, and each of the first recesses is located between the two of the first protruding structures adjacent to each other, wherein the first annular wall is formed in an auxiliary frame pivotally connected to the periphery of the crank spindle, the second one-way clutch and the auxiliary frame are connected to each other, and an end of the auxiliary frame is connected to the chainring, wherein each of the first recesses has two first arc surfaces having different arcs, and when the crank spindle is driven to rotate in the first direction, each of the first rollers is located between one of the first arc surfaces and the first annular wall, each of the first rollers is fixedly held by the first annular member and the first annular wall, the first annular wall rotates in the first direction with the crank spindle, such that the chainring is driven to rotate in the first direction, and wherein, when the crank spindle is driven to rotate in the second direction, each of the first rollers is driven to rotate between another one of the first arc surfaces and the first annular wall, such that the first annular wall is not linked by the crank spindle.

16. The electric bicycle according to claim 15, wherein the second one-way clutch includes a second annular member, a second annular wall, and a plurality of second rollers, the second annular member is formed on a side of the second frame and has a plurality of second protruding structures and plurality of second recesses formed on a periphery thereof, the second protruding structures and the second recesses are spaced apart from each other, and each of the second recesses is located between the two of the second protruding structures adjacent to each other, wherein the second annular wall is formed in the auxiliary frame, and each of the second recesses has two second arc surfaces having different arcs, and wherein, when the driving unit is driven to drive the second frame to rotate in the first direction, each of the second rollers is located between one of the two second arc surfaces and the second annular wall, each of the second rollers is fixedly held by the second annular member and the second annular wall, and the second annular wall rotates in the first direction with the second frame, such that the chainring synchronously rotates in the first direction.

17. The electric bicycle according to claim 16, wherein the dynamic power device further includes a first auxiliary bearing, a second auxiliary bearing, and a third auxiliary bearing, the first auxiliary bearing has an inner ring and an outer ring, the inner ring of the first auxiliary bearing and the periphery of the crank spindle are fixed to each other, and the outer ring of the first auxiliary bearing and an inner side wall of the outer through hole of the outer end cap are fixed to each other, wherein the second auxiliary bearing has an inner ring and an outer ring, the inner ring of the second auxiliary bearing and the periphery of the auxiliary frame are fixed to each other, the outer ring of the second auxiliary bearing and an inner side of the second auxiliary end cap are fixed to each other, and wherein the third auxiliary bearing has an inner ring and an outer ring, the inner ring of the third auxiliary bearing and the periphery of the crank spindle are fixed to each other, the outer ring of the third auxiliary bearing and an inner side of the auxiliary frame are fixed to each other.

\* \* \* \* \*